(12) United States Patent
Son et al.

(10) Patent No.: US 11,191,093 B2
(45) Date of Patent: Nov. 30, 2021

(54) METHOD FOR WIRELESS COMMUNICATION WITH WIRELESS COMMUNICATION TERMINAL FOR LONG RANGE TRANSMISSION AND WIRELESS COMMUNICATION TERMINAL USING SAME

(71) Applicants: HUMAX CO., LTD., Gyeonggi-do (KR); WILUS INSTITUTE OF STANDARDS AND TECHNOLOGY INC., Gyeonggi-do (KR)

(72) Inventors: Juhyung Son, Gyeonggi-do (KR); Jinsam Kwak, Gyeonggi-do (KR); Bonho Koo, Seoul (KR); Kiwon Kang, Gyeonggi-do (KR)

(73) Assignees: WILUS INSTITUTE OF STANDARDS AND TECHNOLOGY INC., Gyeonggi-Do (KR); HUMAX NETWORKS, INC., Gyeonggi-Do (KR)

( * ) Notice: Subject to any disclaimer, the term of this patent is extended or adjusted under 35 U.S.C. 154(b) by 279 days.

(21) Appl. No.: 16/347,579

(22) PCT Filed: Nov. 8, 2017

(86) PCT No.: PCT/KR2017/012628
§ 371 (c)(1),
(2) Date: May 28, 2019

(87) PCT Pub. No.: WO2018/088807
PCT Pub. Date: May 17, 2018

(65) Prior Publication Data
US 2019/0335487 A1    Oct. 31, 2019

(30) Foreign Application Priority Data

Nov. 8, 2016   (KR) .................. 10-2016-0148068
Nov. 25, 2016  (KR) .................. 10-2016-0158302

(51) Int. Cl.
*H04W 72/12*     (2009.01)
*H04L 1/08*      (2006.01)
*H04L 1/18*      (2006.01)

(52) U.S. Cl.
CPC .......... *H04W 72/1263* (2013.01); *H04L 1/08* (2013.01); *H04L 1/1812* (2013.01)

(58) Field of Classification Search
None
See application file for complete search history.

(56) References Cited

U.S. PATENT DOCUMENTS

2002/0128052 A1   9/2002  Neagley et al.
2002/0169539 A1   11/2002 Menard et al.
(Continued)

OTHER PUBLICATIONS

International Search Report for PCT/KR2017/012628 dated Mar. 12, 2018 and its English translation from WIPO (now published as WO 2018/088807).
(Continued)

*Primary Examiner* — Faruk Hamza
*Assistant Examiner* — Alan L Lindenbaum
(74) *Attorney, Agent, or Firm* — Ladas & Parry, LLP

(57) ABSTRACT

Provided is a base wireless communication terminal that communicates with a Long Range (LR) wireless communication terminal supporting LR wireless communication. The base wireless communication terminal includes a transceiver and a processor. The processor is configured to set length information included in a non-LR preamble, which is a preamble for a non-LR wireless communication terminal that does not support LR wireless communication, to be longer than a length from a predetermined point in a Physical layer Protocol Data Unit (PPDU) to an end point of the PPDU, and transmits the PPDU including the non-LR preamble to the LR wireless communication terminal using the transceiver. In this case, the length information is infor-
(Continued)

mation for indicating a length from a predetermined point in the PPDU to an end point of the PPDU.

12 Claims, 11 Drawing Sheets

(56) References Cited

U.S. PATENT DOCUMENTS

| | | | |
|---|---|---|---|
| 2004/0018854 A1 | 1/2004 | Gorsuch | |
| 2007/0183383 A1 | 8/2007 | Bitran et al. | |
| 2010/0325714 A1* | 12/2010 | Iyer | H04W 12/062 |
| | | | 726/8 |
| 2013/0016642 A1* | 1/2013 | Banerjea | H04L 27/2613 |
| | | | 370/311 |
| 2013/0044877 A1 | 2/2013 | Liu et al. | |
| 2018/0359761 A1* | 12/2018 | Chun | H04L 5/0094 |

OTHER PUBLICATIONS

Written Opinion of the International Searching Authority for PCT/KR2017/012628 dated Mar. 12, 2018 and its English translation by Google Translate (now published as WO 2018/088807).

\* cited by examiner

METHOD FOR WIRELESS COMMUNICATION WITH WIRELESS COMMUNICATION TERMINAL FOR LONG RANGE TRANSMISSION AND WIRELESS COMMUNICATION TERMINAL USING SAME

CROSS-REFERENCE TO RELATED APPLICATIONS

This application is the U.S. National Stage of International Patent Application No. PCT/KR2017/012628 filed on Nov. 8, 2017, which claims the priority to Korean Patent Application No. 10-2016-0148068 filed in the Korean Intellectual Property Office on Nov. 8, 2016, and Korean Patent Application No. 10-2016-0158302 filed in the Korean Intellectual Property Office on Nov. 25, 2016, the entire contents of which are incorporated herein by reference.

TECHNICAL FIELD

The present invention relates to a wireless communication method with a wireless communication terminal for long range transmission and a wireless communication terminal using the same.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

Also, recently, in order to support the Internet of Things (IoT) environment, in other words, low-power long-range wireless LAN communication technology has been developed to incorporate wireless LAN communication functions in various objects around us.

As the number of long-range wireless LAN devices increases in addition to existing wireless LAN devices, it is necessary to use the determined channel efficiently. Therefore, required is a technology capable of efficiently using bandwidths by simultaneously transmitting data between a plurality of stations and APs.

DISCLOSURE

Technical Problem

An object of an embodiment of the present invention provides a wireless communication terminal and a wireless communication method for long distance transmission.

Technical Solution

According to an embodiment of the present invention, a base wireless communication terminal that communicates with a Long Range (LR) wireless communication terminal supporting LR wireless communication includes a transceiver and a processor. The processor is configured to set length information included in a non-LR preamble, which is a preamble for a non-LR wireless communication terminal that does not support LR wireless communication, to be longer than a length from a predetermined point in a Physical layer Protocol Data Unit (PPDU) to an end point of the PPDU, and transmit the PPDU including the non-LR preamble to the LR wireless communication terminal using the transceiver. In this case, the length information is information for indicating a length from a predetermined point in the PPDU to an end point of the PPDU.

The processor may be configured to set the length information as a length from a predetermined point in the PPDU to a point corresponding to a time point in which an uplink transmission of the LR wireless communication terminal corresponding to the PPDU is completed.

When the uplink transmission is not received from the LR wireless communication terminal, the processor may be configured to re-transmit a portion after the non-LR preamble without transmitting a portion before the non-LR preamble in the PPDU.

The PPDU may include a first trigger frame for triggering an uplink transmission of the LR wireless communication terminal. When the base wireless communication terminal fails to receive the uplink transmission from the LR wireless communication terminal, the processor may be configured to transmit a second trigger frame having the same sequence number as the first trigger frame. In addition, when the base wireless communication terminal receives the uplink transmission from the LR wireless communication terminal, the processor may be configured to transmit a third trigger frame having a sequence number different from a sequence number of the first trigger frame when triggering a new uplink transmission after the uplink transmission.

The processor may be configured to transmit a data field of the PPDU through a Resource Unit (RU) allocated to the LR wireless communication terminal, and receive the uplink transmission through an RU allocated to the LR wireless communication terminal.

The RU allocated to the LR wireless communication terminal may be allocated when the LR wireless communication terminal and the base wireless communication terminal are associated, and may be maintained until the LR wireless communication terminal and the base wireless communication terminal are disassociated or reassociated.

When the base wireless communication terminal is scheduled to transmit an ACK for uplink transmission of the LR wireless communication terminal to the LR wireless communication terminal, the processor may be configured to set the length information included in the non-LR preamble as a length from a predetermined point in the PPDU to a point corresponding to a time point in which a downlink transmission corresponding to an uplink transmission of the LR wireless communication terminal is completed. In this case, the uplink transmission of the LR wireless communication terminal may be an uplink transmission corresponding to the PPDU.

The PPDU may include a trigger frame for triggering an uplink transmission of the LR wireless communication terminal. In this case, the processor may be configured to signal whether an ACK transmission for uplink transmission of the LR wireless communication terminal is scheduled using the trigger frame.

According to an embodiment of the present invention, an operation method of a base wireless communication terminal that communicates with a Long Range (LR) wireless communication terminal supporting LR wireless communication includes: setting length information included in a non-LR preamble, which is a preamble for a non-LR wireless communication terminal that does not support LR wireless communication, to be longer than a length from a predetermined point in a Physical layer Protocol Data Unit (PPDU) to an end point of the PPDU; and transmitting the PPDU including the non-LR preamble to the LR wireless communication terminal. In this case, the length information is information for indicating a length from a predetermined point in the PPDU to an end point of the PPDU.

The setting the length information included in the non-LR preamble may include setting the length information as a length from a predetermined point in the PPDU to a point corresponding to a time point in which an uplink transmission of the LR wireless communication terminal corresponding to the PPDU is completed.

The operation method may further include, when the base wireless communication fails to receive the uplink transmission from the LR wireless communication terminal, re-transmitting a portion after the non-LR preamble without transmitting a portion before the non-LR preamble in the PPDU.

The PPDU may include a first trigger frame for triggering an uplink transmission of the LR wireless communication terminal.

When the base wireless communication terminal fails to receive the uplink transmission from the LR wireless communication terminal, the re-transmitting the portion after the non-LR preamble includes when the base wireless communication terminal fails to receive the uplink transmission from the LR wireless communication terminal, transmitting a second trigger frame having the same sequence number as the first trigger frame, and when the base wireless communication terminal receives the uplink transmission from the LR wireless communication terminal, transmitting a third trigger frame having a sequence number different from the sequence number of the first trigger frame when triggering a new uplink transmission after the uplink transmission.

The transmitting the PPDU may include transmitting a data field of the PPDU through a Resource Unit (RU) allocated to the LR wireless communication terminal. In this case, the operation may further include receiving the uplink transmission through an RU allocated to the LR wireless communication terminal.

The RU allocated to the LR wireless communication terminal may be allocated when the LR wireless communication terminal and the base wireless communication terminal are associated, and may be maintained until the LR wireless communication terminal and the base wireless communication terminal are disassociated or reassociated.

The setting the length information included in the non-LR preamble may include, when the base wireless communication terminal is scheduled to transmit an ACK for uplink transmission of the LR wireless communication terminal to the LR wireless communication terminal, setting the length information included in the non-LR preamble as a length from a predetermined point in the PPDU to a point corresponding to a time point in which a downlink transmission corresponding to an uplink transmission of the LR wireless communication terminal is completed, and the uplink transmission of the LR wireless communication terminal may be an uplink transmission corresponding to the PPDU.

The PPDU may include a trigger frame for triggering an uplink transmission of the LR wireless communication terminal. In this case, the transmitting the PPDU may include signaling whether an ACK transmission for uplink transmission of the LR wireless communication terminal is scheduled using the trigger frame.

According to another embodiment of the present invention, a wireless communication terminal includes a transceiver; and a processor for controlling transmission and reception of wireless communication signals of the transceiver. The processor may be configured to transmit the BSR of the wireless communication terminal to the base wireless communication terminal, receive the trigger frame indicating the multi user uplink transmission from the base wireless communication terminal, and perform the uplink transmission in response to the received trigger frame.

The BSR may be transmitted using a predetermined uplink request map composed of a plurality of slots capable of carrying BSR information, and the plurality of slots may be divided into at least one of a plurality of subchannel slots and a plurality of time slots.

A slot used for BSR transmission of the wireless communication terminal in the uplink request map may be determined based on a slot counter of the wireless communication terminal and the slot counter may be reduced based on the number of time slots constituting the uplink request map.

The BSR of the wireless communication terminal using the uplink request map may be transmitted in response to a beacon periodically transmitted by the base wireless communication terminal.

The BSR of the wireless communication terminal using the uplink request map may be transmitted following the downlink physical layer protocol data unit (PPDU) transmitted by the base wireless communication terminal.

The length field of the PPDU including the beacon and the length field of the downlink PPDU may be set in consideration of the BSR transmission time using the uplink request map that is performed following the corresponding PPDU.

The BSR may be transmitted through a predetermined narrowband subchannel, and the trigger frame and the uplink transmission corresponding thereto may be performed in a primary channel operated by the base wireless communication terminal.

The predetermined narrowband subchannel may be a subchannel in the 2.422 to 2.427 GHz band or a subchannel in the 2.447 to 2.452 GHz band.

The transmission through the predetermined narrowband subchannel may be performed in each regular period. In this case, the regular period may be set in consideration of a switching gap time for switching the operation band between the primary channel and the predetermined narrowband subchannel.

According to another embodiment of the present invention, an operation method of a wireless communication terminal includes: transmitting a BSR of the wireless communication terminal to a base wireless communication terminal; receiving a trigger frame indicating multi user uplink transmission from the base wireless communication terminal; and performing uplink transmission in response to the received trigger frame.

Advantageous Effects

An embodiment of the present invention provides a wireless communication method with a wireless communication terminal for long range transmission and a wireless communication terminal using the same.

MODE FOR CARRYING OUT THE INVENTION

Figure 1:
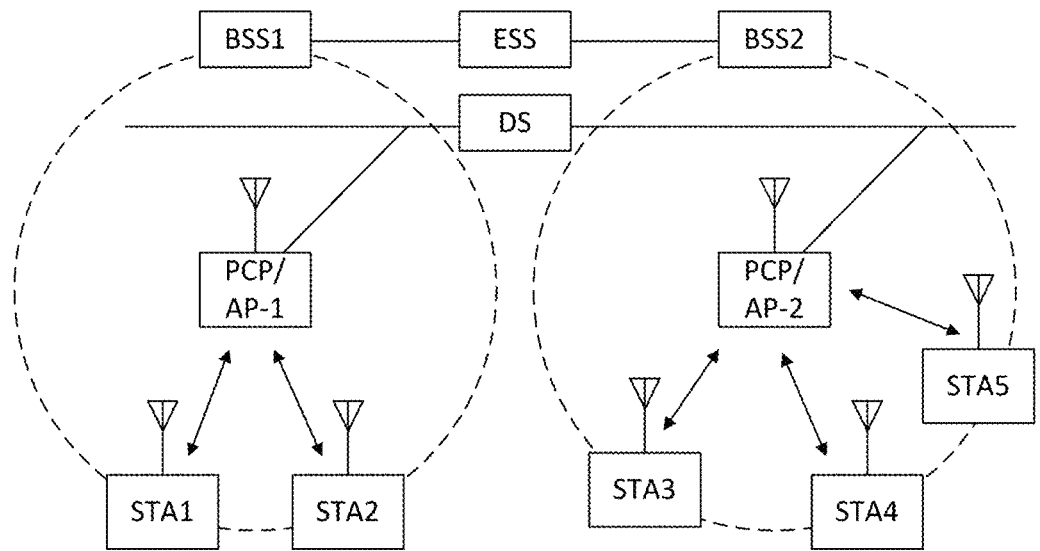
FIG. 1 shows a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2016-0148068 (2016 Nov. 8) and Nos 10-2016-0158302 (2016 Nov. 25) and the embodiments and mentioned items described in the respective applications are included in the Detailed Description of the present application.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
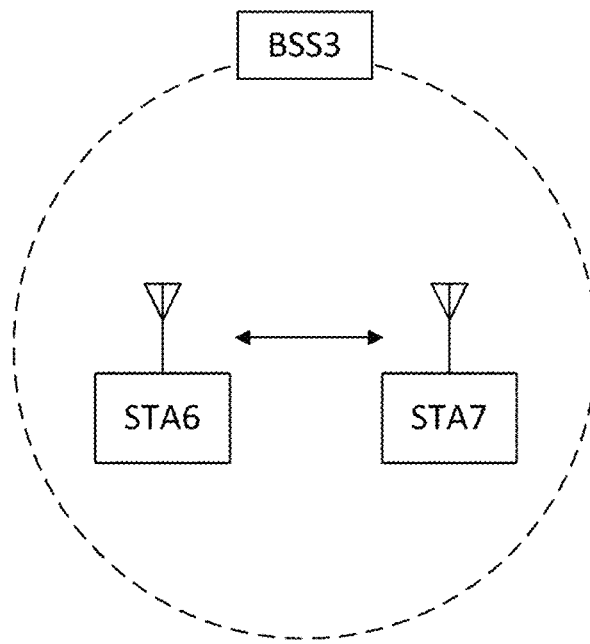
FIG. 2 shows a wireless LAN system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
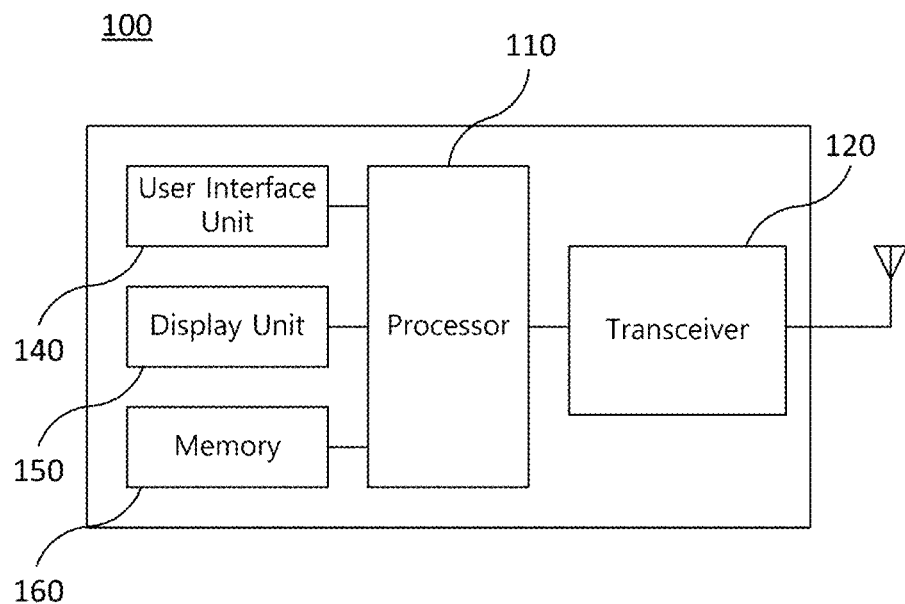
FIG. 3 shows a block diagram illustrating a configuration of a station according to an embodiment of the inventive concept.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN physical layer frame, or the like and may be embedded in the station 100 or provided as an exterior. According to the embodiment, the transceiver 120 may include at least one transmit and receive module using different frequency bands. For example, the transceiver 120 may include transmit and receive modules having different frequency bands such as 2.4 GHz, 5 GHz, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The transceiver 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 may be a modulator and/or demodulator which modulates wireless signal transmitted to the transceiver 120 and demodulates wireless signal received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
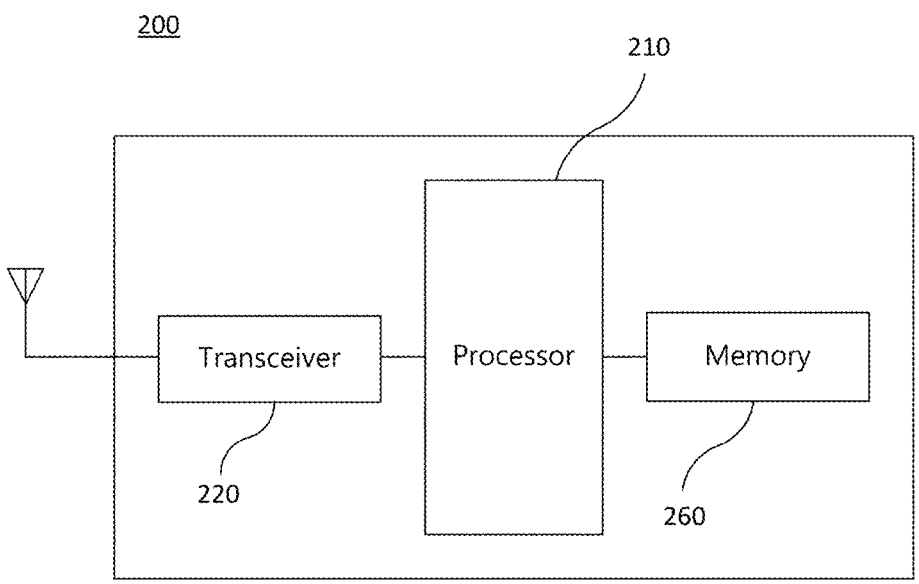
FIG. 4 shows a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit and receive modules using different frequency bands. That is, the AP 200 according to the embodiment of the present invention may include two or more transmit and receive modules among different frequency bands, for example, 2.4 GHz, 5 GHz, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The transceiver 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 may be a modulator and/or demodulator which modulates wireless signal transmitted to the transceiver 220 and demodulates wireless signal received from the transceiver 220. The processor 210 controls various operations such as radio signal transmission/reception of the AP 200 according to the embodiment of the present invention. A detailed embodiment thereof will be described below.

Figure 5:
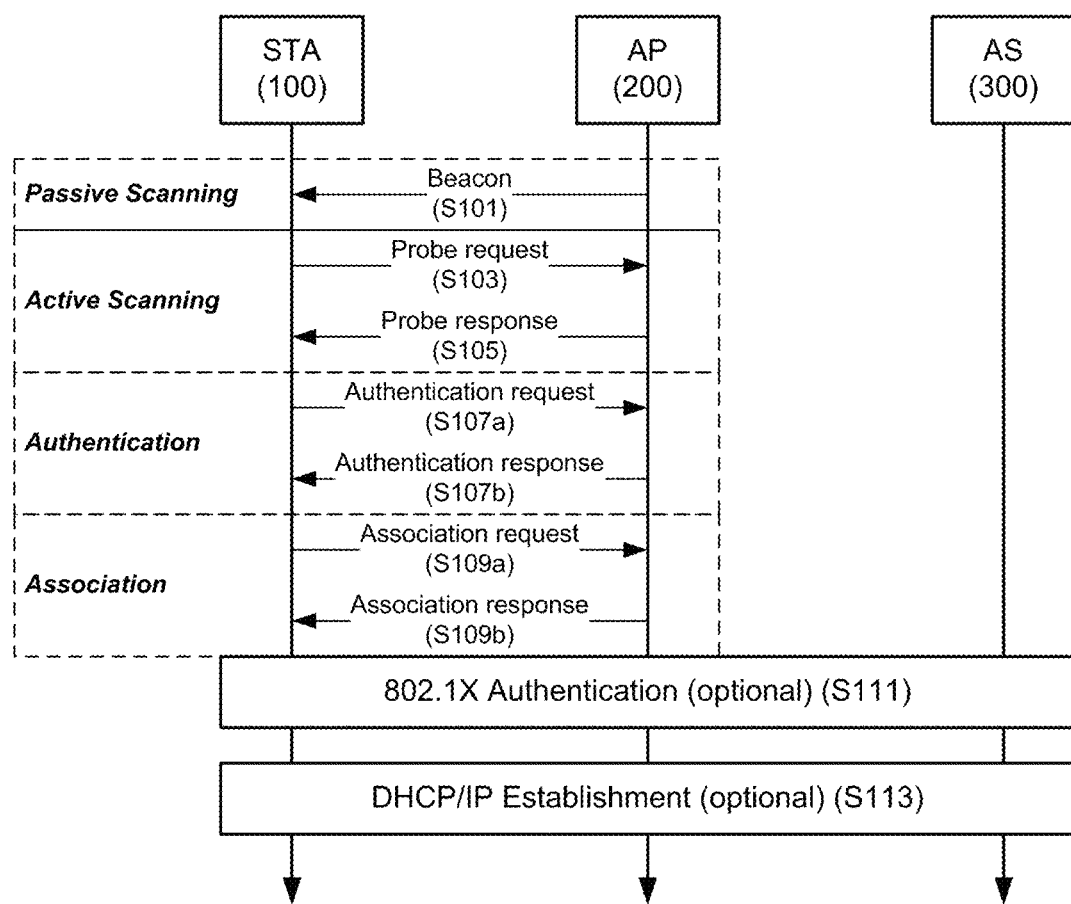
FIG. 5 shows a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

In a specific embodiment, the AP 200 may be a wireless communication terminal that allocates a communication medium resource and performs scheduling in an independent network, such as an ad-hoc network, which is not connected to an external distribution service. In addition, the AP 200 may be at least one of a base station, an eNB, and a transmission point TP. The AP 200 may also be referred to as a base wireless communication terminal.

The base wireless communication terminal may be a wireless communication terminal that allocates and schedules medium resources in communication with a plurality of wireless communication terminals. Specifically, the base wireless communication terminal may serve as a cell coordinator. In a specific embodiment, the base wireless communication terminal may be a wireless communication terminal that allocates and schedules communication medium resources in an independent network, such as an ad-hoc network, that is not connected to an external distribution service.

Figure 6:
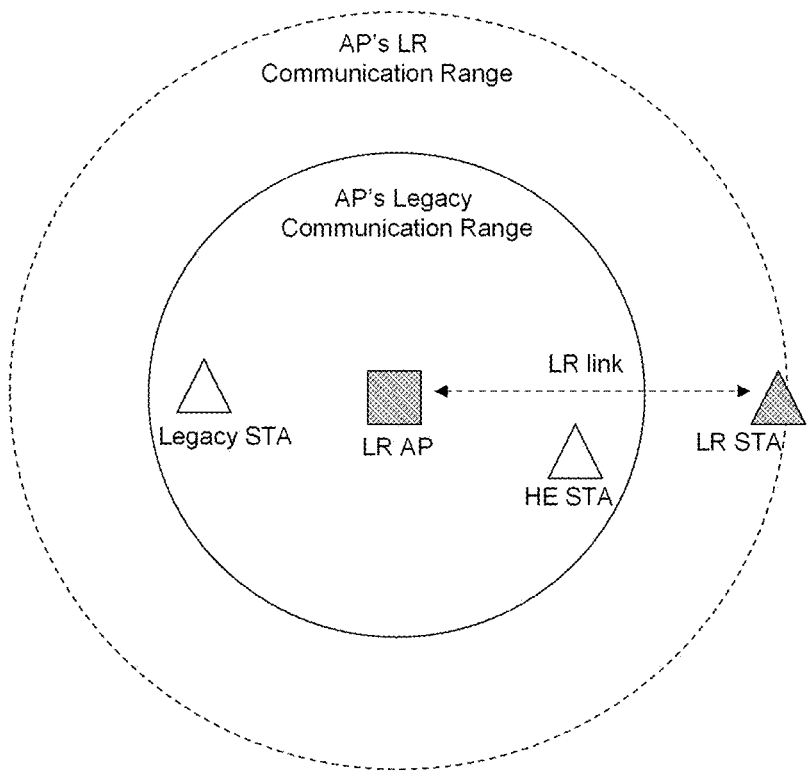
FIG. 6 shows a configuration of a wireless LAN network according to an embodiment of the present invention.

FIG. 6 shows a configuration of a wireless LAN network according to an embodiment of the present invention.

In the wireless LAN communication, the wireless communication terminal may perform long range (LR) communication. Specifically, the wireless communication terminal may transmit the second PPDU using a frequency bandwidth narrower than the frequency bandwidth used when the wireless communication terminal transmits the first physical layer protocol data unit (PPDU) in the wireless LAN frequency band. In this case, the frequency bandwidth may represent the frequency bandwidth of the preamble that is decodable only by the wireless communication terminal capable of receiving the PPDU. For example, if the first PPDU is an IEEE 802.11 ax standard-based PPDU, the preamble that is decodable only by the wireless communication terminal capable of receiving the PPDU is the HE- SIG-A field, and the bandwidth of the preamble that is decodable only by the wireless communication terminal capable of receiving the PPDU may be 20 MHz. That is, the bandwidth of the preamble that is decodable only by the wireless communication terminal capable of receiving the second PPDU may be narrower than 20 MHz. Therefore, the transmission range of the second PPDU may be larger than the transmission range of the first PPDU. Specifically, when the wireless communication terminal transmits the first PPDU and the second PPDU with the same transmission power, the transmission range of the second PPDU may be larger than the transmission range of the first PPDU. In this case, the wireless LAN frequency band may be a frequency band of 2.4 GHz or 5 GHz band used in the IEEE 802.11a/b/g/n/ac/ax standard. For convenience of explanation, the first PPDU may be referred to as a general PPDU, and the second PPDU may be referred to as an LR PPDU. A general PPDU may be a PPDU transmitted based on the IEEE 802.11a/b/g/n/ac standard. In addition, a general PPPDU may be a PPDU transmitted based on the IEEE 802.11ax standard.

The wireless communication terminals transmitting and receiving the LR PPDUs may operate in association with the base wireless communication terminals transmitting and receiving the LR PPDUs. Moreover, for convenience of explanation, the base wireless communication terminal transmitting and receiving the LR PPDU is referred to as an LR base wireless communication terminal. In addition, the LR base wireless communication terminal may transmit and receive the general PPDU as well as the LR PPDU.

In addition, a wireless communication terminal that does not receive the LR PPDU and receives the general PPDU is referred to as a non-LR wireless communication terminal. The non-LR wireless communication terminal may operate according to at least one of IEEE 802.11 a/b/g/n/ac/ax. The non-LR wireless communication terminal may transmit and receive a general PPDU using a frequency band of 20 MHz bandwidth or more. Specifically, the non-LR wireless communication terminal may transmit and receive PPDUs using at least one of frequency bands having bandwidths of 20 MHz, 40 MHz, 80 MHz, 160 MHz, and 80 MHz+80 MHz. In this case, the frequency band having a bandwidth of 80 MHz+80 MHz is not continuous but represents two frequency bands having an 80 MHz bandwidth. Specifically, the non-LR wireless communication terminal may use 64 1-FT-based OFDM using 64 subcarriers in a frequency band having a bandwidth of 20 MHz. Also, the non-LR wireless communication terminal may use 256 FFT-based OFDM using 256 subcarriers in a frequency band having a bandwidth of 20 MHz. In addition, the non-LR wireless communication terminal may perform Orthogonal Frequency Division Multiple Access (OFDMA) based communication using 26 subcarriers, 52 subcarriers, or 102 subcarrier based resource units that are part of a frequency band having a 20 MHz bandwidth.

The non-LR wireless communication terminal may be classified into a legacy wireless communication terminal operating according to any one of IEEE 802.11 a/b/g/n/ac and an HE wireless communication terminal operating according to IEEE 802.11 ax. The general PPDU may include a legacy preamble that is decodable by both the legacy wireless communication terminal and the HE wireless communication terminal. Specifically, the legacy preamble may include L-STF, L-LTF, and L-SIG fields.

The LR wireless communication terminal that is not the base wireless communication terminal may not receive or transmit a general PPDU. Specifically, the LR wireless communication terminal that is not a base wireless communication terminal may use only a frequency band having a bandwidth narrower than a bandwidth used for transmission of a general PPDU. For example, an LR wireless communication terminal that is not a base wireless communication terminal may use a frequency band having a bandwidth of 2.5 MHz or 5 MHz. In this case, the LR wireless communication terminal may use 32 FFT-based OFDM using 32 subcarriers or 64 FFT-based OFDM using 64 subcarriers.

The LR wireless communication terminal that is the base wireless communication terminal may receive or transmit not only the LR PPDU but also the general PPDU. Specifically, the LR wireless communication terminal that is a base wireless communication terminal may use not only a frequency band having a bandwidth narrower than the minimum bandwidth used for transmission of a general PPDU but also a frequency band having a bandwidth used for transmission of a general PPDU. For example, the LR wireless communication terminal that is a base wireless communication terminal may use at least one of a frequency band having a bandwidth of 2.5 MHz or 5 MHz, as well as a frequency band having a bandwidth of 20 MHz, 40 MHz, 80 MHz, 160 MHz and 80 MHz+80 MHz. The LR wireless communication terminal that is a base wireless communication terminal may use 32 FFT-based OFDM using 32 subcarriers in a frequency band having a 2.5 MHz bandwidth. In addition, the LR wireless communication terminal that is a base wireless communication terminal may use 64 FFT-based OFDM using 64 subcarriers in a frequency band having a 5 MHz bandwidth. In addition, the LR wireless communication terminal that is the base wireless communication terminal may use a mixed PPDU for communicating with the LR wireless communication terminal and the non-LR wireless communication terminal through one PPDU. This will be described in detail with reference to FIGS. 10 to 12.

In addition, the LR PPDU may include a preamble for a non-LR wireless communication terminal. Through this, collision with the non-LR wireless communication terminal may be prevented, and transmission of the non-LR PPDU and transmission of the LR PPDU may coexist without collision.

In the embodiment of FIG. 6, an LR access point LR AP communicates with a non-LR station: Legacy STA and HE STA and an LR station LR STA. In this case, the LR access point LR AP may communicate with the LR station LR STA in a range wider than the range capable of communicating with the non-LR station: Legacy STA and HE STA. The PPDU format transmitted by the wireless communication terminal according to the embodiment of the present invention will be described in detail with reference to FIG. 7.

Figure 7:
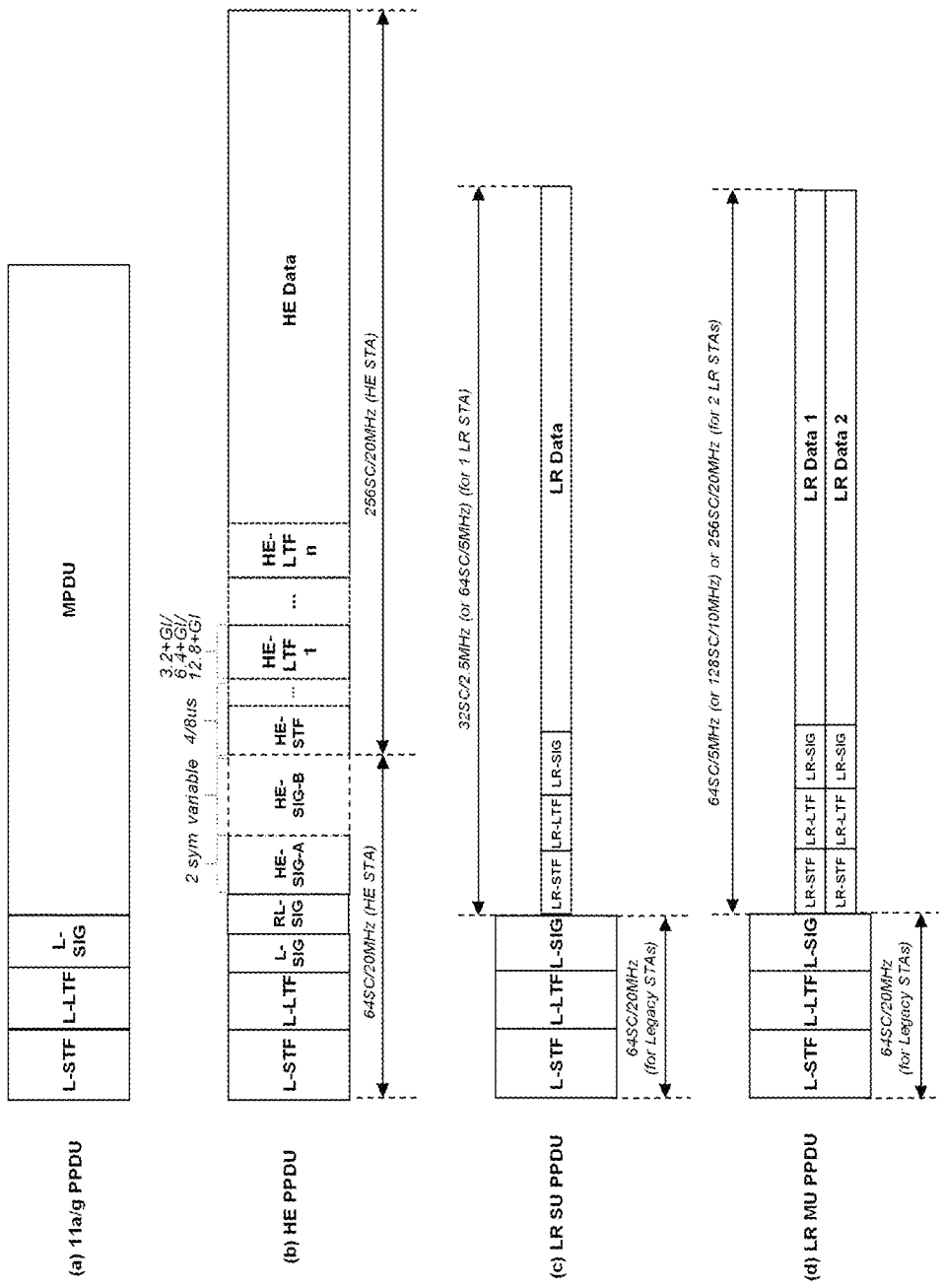
FIG. 7 shows a format of a PPDU used by a wireless communication terminal according to an embodiment of the present invention.

FIG. 7 shows a format of a PPDU used by a wireless communication terminal according to an embodiment of the present invention.

FIG. 7(a) shows the PPDU format according to the IEEE 802.11a/g standard. A PPDU according to the IEEE 802.11a/g standard includes an L-STF field, an L-LTF field, an L-SIG field, and a data field. The data field indicates data included in the PPDU. In this case, the data may be a MAC Protocol Data Unit (MPDU) format. The L-SIG field signals information that the legacy wireless communication terminal may decode. L-STF and L-LTF are training signals used for L-SIG field reception. The legacy wireless communication terminal may perform at least one of Automatic Gain Control (AGC), Time Synchronization (TS), and Frequency Offset Detection (FOD) based on L-STF and L-LTF. The legacy wireless communication terminal may determine the length of the PPDU based on the L-SIG. Further, the legacy wireless communication terminal receives data based on information signaled by the L-SIG field.

FIG. 7(b) shows the PPDU format according to the IEEE 802.11ax standard. The PPDU according to the IEEE 802.11ax standard includes an L-STF field, an L-LTF field, an L-SIG field, an RL-SIG field, a HE-SIG-A field, a HE-LTF, and Data field. In this case, the L-STF field, the L-LTF field, and the L-SIG field are the same as those described with reference to FIG. 7(a). The RL-SIG field indicates that the corresponding PPDU is an HE PPDU in the form in which the L-SIG field is repeated. The HE-SIG-A and HE-SIG-B fields signal information on the configuration of the HE PPDU. The HE-SIG-A field contains information for decoding the HE PPDU. Specifically, when the PPDU includes the HE-SIG-B field, the HE-SIG-A field includes a length of the HE-SIG-B field and information on Modulation & Coding Scheme (MCS) of the HE-SIG-B field. In addition, the HE-SIG-A field may include an indicator indicating whether the transmission of the PPDU corresponds to the downlink transmission or the uplink transmission. In addition, the HE-SIG-A field may include information for identifying the BSS color to which the wireless communication terminal that transmitted the PPDU belongs. The number of symbols transmitting the HE-SIG-A field may be fixed. For example, the number of symbols for transmitting the HE-SIG-A field may be two.

If the PPDU including the HE-SIG-B field is a multi-user (MU) transmission, the HE-SIG-B field may signal resource allocation information for each user. In addition, the HE-SIG-B field may have a variable length. Specifically, the number of symbols transmitting the HE-SIG-B field may be variable.

HE-STF and HE-LTF are training signals for data field reception using 256 FFT-based OFDM. The wireless communication terminal may perform AGC and FOD in the 20 MHz band based on the HE-STF and the HE-LTF, and estimate a channel through which 256 subcarriers are transmitted. Also, the HE-LTF may be transmitted in a variable number according to the number of spatial streams. The HE-LTF may be divided into HE-LTF-1X, HE-LTF-2X and HE-LTF-4X depending on the application. The HE-LTF-1X/2X is used in indoor environment communication and has a duration of the sum of a 3.2us/6.4us signal and an additional guard interval, and the HE-LTF-4X is used for outdoor communication and has a duration of the sum of a 12.8us signal and an additional guard interval.

The data field indicates data included in the PPDU. In this case, the data may be in an Aggregate (A)-MAC Protocol Data Unit (MPDU) format.

FIG. 7(c) shows a format of an LR SU PPDU transmitted by an LR wireless communication terminal that is a base wireless communication terminal according to an embodiment of the present invention. In addition, FIG. 7(d) shows a format of an LR MU PPDU transmitted by an LR wireless communication terminal that is a base wireless communication terminal according to an embodiment of the present invention.

The LR PPDU may include at least one of an L-STF field, an L-LTF field, an L-SIG field, an LR-STF field, an LR-LTF field, and an LR-SIG field. In this case, the L-STF field, the L-LTF field, and the L-SIG field may perform the same functions as those described with reference to 7(a). Specifically, the non-LR wireless communication terminal may determine the length of the LR PPDU based on the L-SIG field. In this case, the non-LR wireless communication terminal may not attempt transmission in the frequency band in which the LR PPDU is transmitted during the length of the LR PPDU. The LR-STF and LR-LTF are training signals used to receive the LR-SIG field. The LR wireless communication terminal may perform AGC, TS, and FOD using the LR-STF and the LR-LTF, and estimate the channel through which the LR-SIG and the data field are transmitted. Also, the LR-LTF may be transmitted in a variable number according to the number of spatial streams. The LR-SIG field includes information for decoding the LR PPDU. Specifically, the LR-SIG field may include at least one of information on a Modulation & Coding Scheme (MCS) of LR Data, an indicator indicating whether the transmission of the PPDU corresponds to a downlink transmission or an uplink transmission, and BSS color information that identifies the BSS to which the wireless communication terminal that transmitted the PPDU belongs. The LR wireless communication terminal may receive the LR data field based on the LR-SIG field. The LR data field indicates data included in the LR PPDU. In this case, the data may be in A-MPDU format.

The LR wireless communication terminal transmitting the LR PPDU may vary the OFDM modulation method according to the size of the frequency bandwidth allocated to the LR wireless communication terminal receiving the LR PPDU. Specifically, the LR wireless communication terminal transmitting the LR PPDU may change the number of subcarriers used for OFDM modulation according to the size of the frequency band allocated to the LR wireless communication terminal receiving the LR PPDU. In a specific embodiment, an LR wireless communication terminal transmitting an LR PPDU may transmit an LR PPDU using a predetermined number of subcarriers in a frequency band having a minimum unit bandwidth of the LR transmission. If a frequency band having a bandwidth having a multiple of a minimum unit bandwidth is allocated to a wireless communication terminal receiving an LR PPDU, the LR wireless communication terminal transmitting the LR PPDU may transmit the LR PPDU using a predetermined number of subcarriers. For example, an LR wireless communication terminal transmitting an LR PPDU may transmit an LR PPDU using 32 FFT-based OFDM in a frequency band having a 2.5 MHz bandwidth. In this case, the LR wireless communication terminal may transmit the LR PPDU based on 32 subcarriers. When a 5 MHz frequency band is allocated to any one of the LR wireless communication terminals, an LR wireless communication terminal transmitting an LR PPDU may transmit an LR PPDU based on 64 subcarriers. In this case, the LR wireless communication terminal transmitting the LR PPDU may transmit the LR PPDU using the 64 FFT-based OFDM.

The LR wireless communication terminals transmitting LR PPDUs may transmit L-STF, L-LTF, and L-SIG fields using 64 FFT-based OFDM in a frequency band having a bandwidth of 20 MHz. In addition, the LR wireless communication terminal transmitting the LR PPDU may transmit LR-STF, LR-LTF, LR-SIG field, and LR data field using 256 FFT-based OFDM in a frequency band having a bandwidth of 20 MHz. Specifically, the LR wireless communication terminal transmitting the LR PPDU nulls subcarriers of a frequency band not occupied by the LR-STF, LR-LTF, LR-SIG, and LR data fields, and transmits LR-STF, LR-LTF, LR-SIG and LR data fields by performing an inverse FFT. In this embodiment, the LR wireless communication terminal transmitting the LR PPDU may have an advantage that it does not need to support various kinds of FFT configurations other than the OFDM transmission of 64 FFT and 256 FFT configurations.

The LR wireless communication terminal receiving the LR PPDU may not receive the L-STF, L-LTF, and L-SIG that the non-LR wireless communication terminal is capable of receiving. This is because the LR wireless communication terminal that is not the base wireless communication terminal may only support for receiving the LR PPDU in the frequency band of the bandwidth in which the LR data field is transmitted. In this case, the LR wireless communication terminal receiving the LR PPDU may receive the LR data field from the Resource Unit (RU) agreed with the wireless communication terminal transmitting the LR PPDU. Further, when the LR PPDU is an LR Multi User (MU) PPDU including data transmitted simultaneously to a plurality of LR wireless communication terminals, the LR wireless communication terminal that is the base wireless communication terminal may transmit the LR data field through each of the plurality of RUs allocated to each of the plurality of LR wireless communication terminals. In this case, each of the plurality of RUs may be agreed between a plurality of LR wireless communication terminals and an LR wireless communication terminal that is a base wireless communication terminal. Specifically, the LR wireless communication terminal that is the base wireless communication terminal may transmit the LR MU PPDU as shown in FIG. 7(d) to a plurality of LR wireless communication terminals.

The L-SIG field described with reference to FIG. 7 may indicate the length of the corresponding PPDU using the L_LENGTH subfield and the L_DATARATE subfield in the L-SIG field.

The legacy wireless terminal may obtain the remaining length of the PPDU signaled by the L_LENGTH subfield of the L-SIG field and determine the duration of transmission of the PPDU using the obtained length and the transmission rate indicated by the L_DATARATE subfield In this case, the remaining length may indicate the length from the L-SIG field to the end point of the PPDU. Therefore, the legacy wireless communication terminal may not decode other parts of the PPDU other than the legacy preamble, but does not interfere with the PPDU transmission. In such a manner, the base wireless communication terminal may protect downlink transmission of the LR wireless communication terminal and uplink transmission of the LR wireless communication terminal using the length information included in the signaling field, which indicates the length from the predetermined point in the PPDU to the end point of the PPDU. This will be described with reference to FIGS. 8 to 12.

Figure 8:
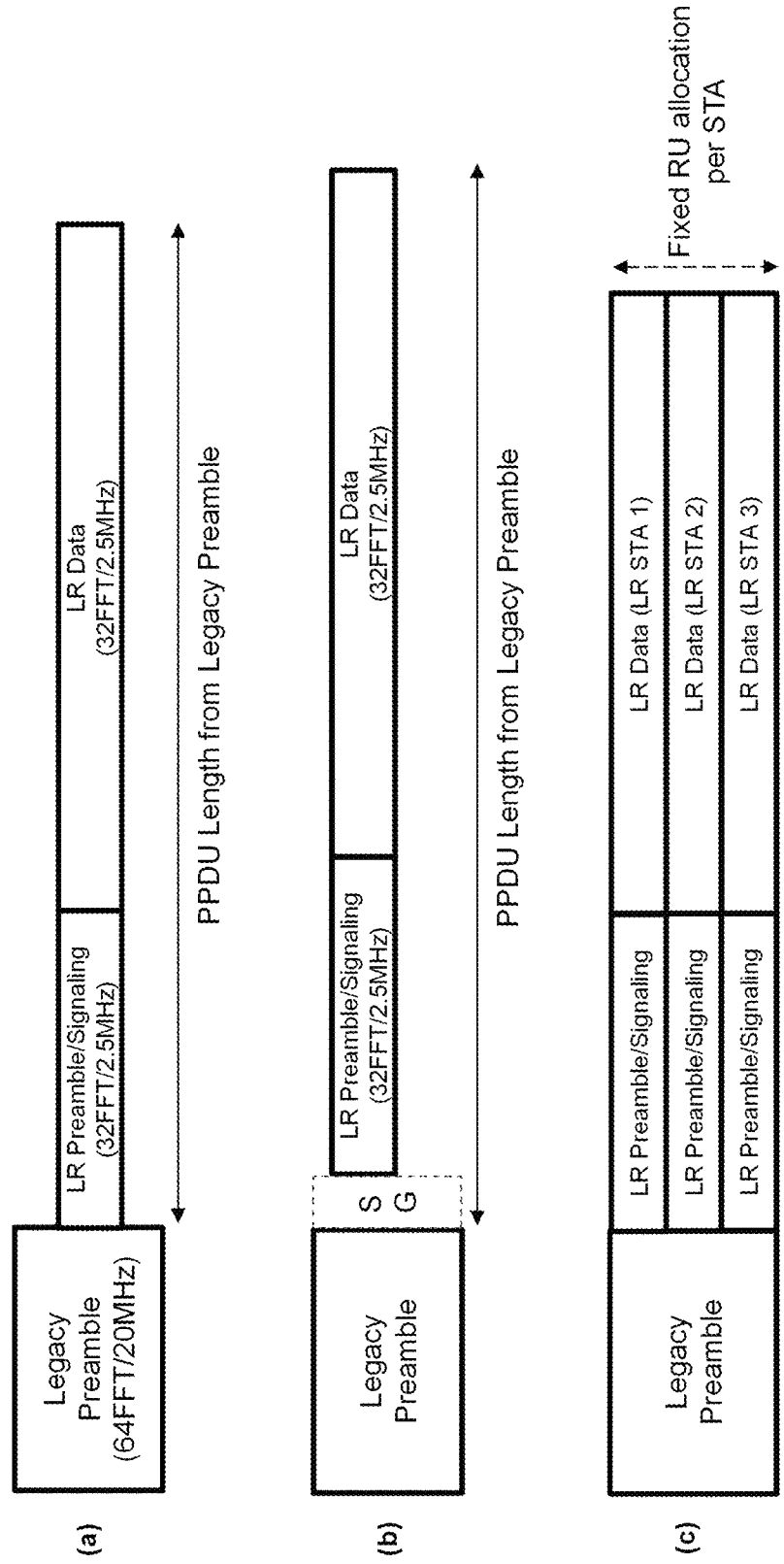
FIG. 8 shows that the wireless communication terminal according to an embodiment of the present invention protects the transmission for the LR wireless communication terminal by using the signaling information indicating the length of the PPDU.

FIG. 8 shows that the wireless communication terminal according to an embodiment of the present invention protects the transmission for the LR wireless communication terminal by using the signaling information indicating the length of the PPDU.

The PPDU used for communication between the base wireless communication terminal and the LR wireless communication terminal may include a non-LR preamble, an LR preamble, and an LR data field. In this case, the base wireless communication terminal may transmit the LR preamble and the LR data field using a frequency band having a bandwidth narrower than the bandwidth of the frequency band in which the non-LR preamble is transmitted. The non-LR preamble may include the legacy preamble described above.

Specifically, the base wireless communication terminal may transmit a legacy preamble using a 64 FFT through a frequency band having a bandwidth of 20 MHz. Also, the base wireless communication terminal may transmit the LR preamble and the LR data field using 32 FFT through a frequency band having a 2.5 MHz bandwidth. In yet another specific embodiment, the base wireless communication terminal may transmit LR preamble and LR data fields using 64 FFT through a frequency band having a bandwidth of 5 MHz.

The LR preamble may include an LR training signal, which is a training signal for the LR wireless communication terminal, and an LR signaling field, which is a signaling field for the LR wireless communication terminal. In this case, the LR training signal may include LR-STF and LR-LTF described above. Also, the LR signaling field may be the LR-SIG field described above.

The base wireless communication terminal may transmit the LR data field in the MPDU format including the MAC header and the MAC payload.

The non-LR preamble may include length information for indicating the length from the predetermined point in the PPDU to the end point of the PPDU. The base wireless communication terminal may set the length information to a length from the predetermined point in the PPDU to the end point of the LR data field. In this case, the predetermined point may be the end point of the non-LR preamble. When the non-LR preamble includes the L-SIG field described above, the base wireless communication terminal may set the length from the L-SIG field to the end point of the LR data field using the L_Rate subfield and the L_Length subfield.

In the embodiment of FIG. 8(a), the base wireless communication terminal transmits a legacy preamble Legacy Preamble using a 64 FFT through a frequency band having a bandwidth of 20 MHz. Then, the base wireless communication terminal transmits LR preamble LR Preamble/Signaling and LR data field using 32 FFT through a frequency band having a bandwidth of 2.5 Hz. In this case, the length information included in the legacy preamble signals the length from the end point of the legacy preamble to the end point of the LR data field. That is, the length information indicates the length obtained by adding the length of the LR preamble and the length of the LR data.

In the embodiment of FIG. 8(a), the base wireless communication terminal transmits the LR preamble and the LR data field at the center frequency of the frequency band in which the legacy preamble is transmitted. The base wireless communication terminal may transmit the LR preamble and the LR data field using a frequency band that is not a frequency band based on the center frequency of the frequency band in which the legacy preamble is transmitted. In this case, the base wireless communication terminal may need time to change the center frequency of transmission. Therefore, the base wireless communication terminal may start the LR preamble transmission after a predetermined time elapses after transmitting the legacy preamble. In this case, the predetermined time may be referred to as a switching gap. Also, the base wireless communication terminal may transmit dummy data during the switching gap. In yet another specific embodiment, the base wireless communication terminal may maintain the switching gap as a null time that does not transmit anything. Further, the size of the switching gap may be a pre-fixed value. In another specific embodiment, the size of the switching gap may be set by the base wireless communication terminal. In addition, the length information included in the legacy preamble may include the length of the switching gap.

In the embodiment of FIG. 8(b), the base wireless communication terminal transmits a legacy preamble using 64 FFTs through a frequency band having a bandwidth of 20 MHz. Then, during a predetermined switching gap, the base wireless communication terminal stops transmission. The base wireless communication terminal selects one of frequency bands having a plurality of 2.5 Hz bandwidths included in the frequency band in which the legacy preamble is transmitted. After a time elapses by the switching gap, the base wireless communication terminal transmits the LR preamble (LR preamble/signaling) and the LR data field using 32 FFT through the selected frequency band. In this case, the length information included in the legacy preamble signals the length from the end point of the legacy preamble to the end point of the LR data field. That is, the length information indicates the length of the sum of the switching gap, the length of the LR preamble, and the length of the LR data.

The base wireless communication terminal may transmit an LR data field to a plurality of LR wireless communication terminals using Orthogonal Frequency Division Multiple Access (OFDMA). In this case, the plurality of LR wireless communication terminals may receive the LR data field through the frequency band allocated to each of the plurality of LR wireless communication terminals. In this case, the positions of the frequency bands allocated to the plurality of LR wireless communication terminals may be fixed. Specifically, when the base wireless communication terminal is associated with the LR wireless communication terminal, the base wireless communication terminal may allocate a fixed frequency band to the LR wireless communication terminal. Also, the frequency band of the fixed location allocated to the LR wireless communication terminal may be maintained until the base wireless communication terminal and the LR wireless communication terminal are disassociated or reassociated.

In FIG. 8(c), the base wireless communication terminal transmits a legacy preamble using 64 FFTs through a frequency band having a bandwidth of 20 MHz. Thereafter, the base wireless communication terminal divides the frequency band that transmits the legacy preamble, and transmits an LR preamble (LR Preamble/Signaling) and an LR data field to each of the first LR station LR STA1, the second LR station LR STA2 and the third LR station LR STA3 through each of the divided frequency bands. Specifically, the base wireless communication terminal transmits an LR preamble (LR Preamble/Signaling) and an LR data field through the Resource Unit (RU) allocated to each of the first LR station LR STA1, the second LR station LR STA2 and the third LR station LR STA3. In this case, the positions of the RUs allocated to the first LR station LR STA1, the second LR station LR STA2, and the third LR station LR STA3 are fixed. Furthermore, the length information included in the legacy preamble signals the length from the end point of the legacy preamble to the end point of the LR data field.

Through such an embodiment, even when the LR wireless communication terminal receives the LR MU PPDU, which is the PPDU transmitted from the base wireless communication terminal to the plurality of LR stations using the OFDMA, the LR wireless communication terminal may process only the RU allocated to the LR wireless communication terminal. In addition, as the center frequency of the PPDU received by the LR wireless communication terminal is changed, the operation of changing the center frequency may not be performed. Therefore, the power consumption of the LR wireless communication terminal may be reduced. Further, after the first RU is allocated to the LR wireless communication terminal, a dynamic signaling process for signaling an RU allocated to the LR wireless communication terminal may not be required. Specifically, when the RU is dynamically allocated to the LR wireless communication terminal, the base wireless communication terminal may be required to signal to the LR wireless communication terminal the configuration of the RU used in the corresponding PPDU and the identifier of the LR wireless communication terminal allocated to each RU by each PPDU. Accordingly, it is possible to reduce the overhead caused by signaling the RU allocated to the LR wireless communication terminal. However, as the number of LR wireless communication terminals increases, the same RU may be allocated to a plurality of LR wireless communication terminals. In addition, the configuration of the LR wireless communication terminal capable of simultaneously receiving the LR data field through one LR MU PPDU may be limited.

The uplink transmission of the LR wireless communication terminal may also be protected by using the length information included in the non-LR preamble. This will be described with reference to FIG. 9.

Figure 9:
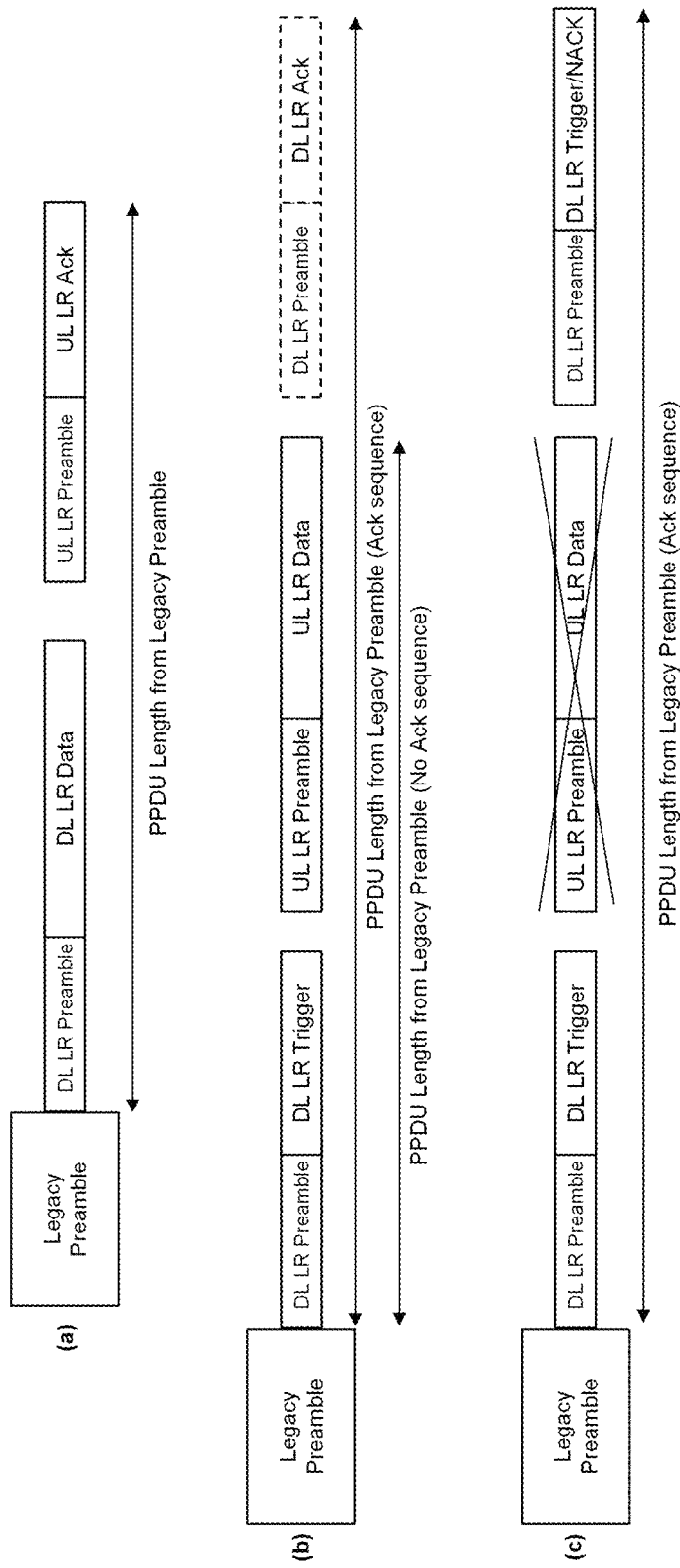
FIG. 9 shows that the wireless communication terminal according to an embodiment of the present invention protects the communication sequence with the LR wireless communication terminal using the signaling field indicating the length of the PPDU.

FIG. 9 shows that the wireless communication terminal according to an embodiment of the present invention protects the communication sequence with the LR wireless communication terminal using the signaling field indicating the length of the PPDU.

Specifically, the base wireless communication terminal may set the length information included in the non-LR preamble to a length from the predetermined point in the PPDU to the end time point of the LR data field. The base wireless communication terminal may obtain the point corresponding to the end time point based on the transmission duration of the uplink transmission and the time interval between the downlink transmission and the uplink transmission. The predetermined point may be the end point of the non-LR preamble. When the non-LR preamble includes the L-SIG field described above, the base wireless communication terminal may set the L_Rate subfield and the L_Length subfield to the length from the L-SIG subfield to the point corresponding to the end time point of the uplink transmission of the LR wireless communication terminal. In this case, the uplink transmission of the LR wireless communication terminal may be the transmission including the ACK for the data transmission of the base wireless communication terminal.

In the embodiment of FIG. 9(*a*), the base wireless communication terminal transmits a legacy preamble Legacy Preamble, and transmits the LR preamble DL LR Preamble and the LR data field DL LR Data to the LR wireless communication terminal. The LR wireless communication terminal transmits an LR PPDU including an LR preamble UL LR preamble and an ACK for data received from the base wireless communication terminal to the base wireless communication terminal. In this case, the length information included in the legacy preamble Legacy Preamble indicates the length from the predetermined point in the PPDU to the point corresponding to the time point at which the ACK transmission of the LR wireless communication terminal ends.

In addition, the uplink transmission of the LR wireless communication terminal protected by the length information included in the non-LR preamble may be the transmission triggered by the base wireless communication terminal. Specifically, the uplink transmission of the LR wireless communication terminal may be the transmission triggered by the trigger frame transmitted by the base wireless communication terminal. In this case, the trigger frame may indicate the length of the uplink transmission. In this case, the length of the uplink transmission may indicate information related to the length of the uplink transmission PPDU. The LR wireless communication terminal may determine the length of the uplink transmission PPDU according to the length of the uplink transmission indicated by the trigger frame. The LR wireless communication terminal may transmit the PPDU including the uplink transmission data having the determined length.

Also, the base wireless communication terminal may transmit an ACK for the uplink transmission of the LR wireless communication terminal. Specifically, when the base wireless communication terminal is scheduled to transmit an ACK for the uplink transmission based on the trigger frame, the base wireless communication terminal may set the length information included in the non-LR preamble to a length from a predetermined point in the PPDU to a point corresponding to when the ACK transmission for the uplink transmission of the LR wireless communication terminal is completed.

The base wireless communication terminal may not transmit the ACK for the uplink transmission of the LR wireless communication terminal. In this case, the base wireless communication terminal may transmit an ACK for the uplink transmission of the LR wireless communication terminal together when transmitting the next trigger frame. In another specific embodiment, as the base wireless communication terminal does not trigger the uplink transmission of the LR wireless communication terminal again, it may be implicitly signaled that the uplink transmission is successful. The base wireless communication terminal may set the length information included in the non-LR preamble to a length from the predetermined point in the PPDU to the point corresponding to when the uplink transmission of the LR wireless communication terminal is completed. In a specific embodiment, the base wireless communication terminal may use a trigger frame to indicate whether the base wireless communication terminal transmits an ACK for trigger-based uplink transmission of the LR wireless communication terminal. Therefore, the trigger frame may indicate whether the base wireless communication terminal is scheduled to transmit the ACK for the trigger-based uplink transmission of the LR wireless communication terminal.

Further, when the LR wireless communication terminal performs uplink transmission to the base wireless communication terminal, it may transmit a Buffer Status Report (BSR) indicating information on data stored in the transmission buffer together with the uplink data. In this case, the base wireless communication terminal may determine whether to further transmit the trigger frame based on the BSR transmitted by the LR wireless communication terminal.

In the embodiment of FIG. 9(b), the base wireless communication terminal transmits a legacy preamble Legacy Preamble, and transmits the LR preamble DL LR Preamble and the LR data field DL LR Trigger including a trigger frame to the LR wireless communication terminal. The LR wireless communication terminal transmits the LR PPDU including the LR preamble UL LR Preamble and the uplink data UL LR Data to the base wireless communication terminal based on the trigger frame. In this case, the base wireless communication terminal may additionally transmit an ACK for uplink data to the LR wireless communication terminal. When the base wireless communication terminal transmits an ACK for uplink data to the LR wireless communication terminal, the base wireless communication terminal may set the length information included in the legacy preamble to a length from a predetermined point in the PPDU to a point corresponding to when the ACK transmission for uplink transmission of the LR wireless communication terminal is completed. Moreover, when the base wireless communication terminal does not transmit an ACK for uplink data to the LR wireless communication terminal, the base wireless communication terminal may set the length information included in the legacy preamble to a length from a predetermined point in the PPDU to a point corresponding to when the uplink transmission of the LR wireless communication terminal is completed.

If the base wireless communication terminal fails to receive the uplink transmission corresponding to the downlink transmission from the LR wireless communication terminal, the base wireless communication terminal may attempt downlink transmission again. In this case, the base wireless communication terminal may re-transmit the portion after the non-LR preamble except for the non-LR preamble in the PPDU transmitted earlier. Specifically, when the base wireless communication terminal transmits the trigger frame but fails to receive the trigger-based uplink transmission from the LR wireless communication terminal, the base wireless communication terminal may retrigger the trigger based uplink transmission by transmitting the trigger frame again. In a specific embodiment, when the base wireless communication terminal transmits the trigger frame, the base wireless communication terminal may re-transmit the portion after the non-LR preamble except for the non-LR preamble in the PPDU transmitted earlier. In this case, transmission of the trigger frame by the base wireless communication terminal may indicate that the base wireless communication terminal fails to receive the uplink transmission from the LR wireless communication terminal. Specifically, the re-transmission of the trigger frame by the base wireless communication terminal may indicate a NACK for the uplink transmission of the LR wireless communication terminal. In addition, the trigger frame may include a sequence number. The base wireless communication terminal may set the sequence number of the trigger frame to be transmitted again to be equal to the sequence number of the previously transmitted trigger frame. Further, when the base wireless communication terminal transmits a new trigger frame, the base wireless communication terminal may set the sequence number of the trigger frame to be differently from the sequence number of the previously transmitted trigger frame. For example, when the base wireless communication terminal transmits the first trigger frame to the LR wireless communication terminal and fails to receive the uplink transmission corresponding to the first trigger frame from the LR wireless communication terminal, the base wireless communication terminal may transmit the second trigger frame having the same sequence number as the first trigger frame. When the base wireless communication terminal transmits the first trigger frame to the LR wireless communication terminal, receives the uplink transmission corresponding to the first trigger frame from the LR wireless communication terminal, and triggers a new uplink transmission different from the uplink transmission triggered by the first trigger frame, the base wireless communication terminal may transmit a third trigger frame having a sequence number different from the sequence number of the first trigger frame. The LR wireless communication terminal may determine whether the trigger frame is the re-transmitted trigger frame depending on whether the sequence number of the trigger frame is the same as the sequence number of the previously received trigger frame. Specifically, when the sequence number of the trigger frame received by the LR wireless communication terminal is equal to the sequence number of the trigger frame received most recently, the LR wireless communication terminal may determine that the most recent uplink transmission attempted by the LR wireless communication terminal is failed. In addition, when the sequence number of the trigger frame received by the LR wireless communication terminal is different from the sequence number of the trigger frame received most recently, the LR wireless communication terminal may determine that the most recent uplink transmission attempted by the LR wireless communication terminal is succeeded.

The uplink transmission based on the trigger frame transmitted again from the base wireless communication terminal may not be protected by the length information included in the non-LR preamble. Therefore, the LR wireless communication terminal may select whether to perform uplink transmission based on the re-transmitted trigger frame. Further, the base wireless communication terminal may use the trigger frame to signal whether the uplink transmission based on the corresponding trigger frame is optional or essential. Also, the base wireless communication terminal may transmit the NACK frame to the LR wireless communication terminal instead of transmitting the trigger frame again.

In the embodiment of FIG. 9(c), the base wireless communication terminal transmits a legacy preamble Legacy Preamble, and transmits the LR preamble DL LR Preamble and the LR data field DL LR Trigger including a trigger frame to the LR wireless communication terminal. The base wireless communication terminal does not receive the uplink transmission based on the trigger frame from the LR wireless communication terminal. In this case, the base wireless communication terminal transmits the trigger frame again to the LR wireless communication terminal. Specifically, the base wireless communication terminal transmits an LR preamble DL LR Preamble and an LR data field DL LR Trigger including a trigger frame. In this case, the base wireless communication terminal may transmit the NACK frame instead of the trigger frame.

Figure 10:
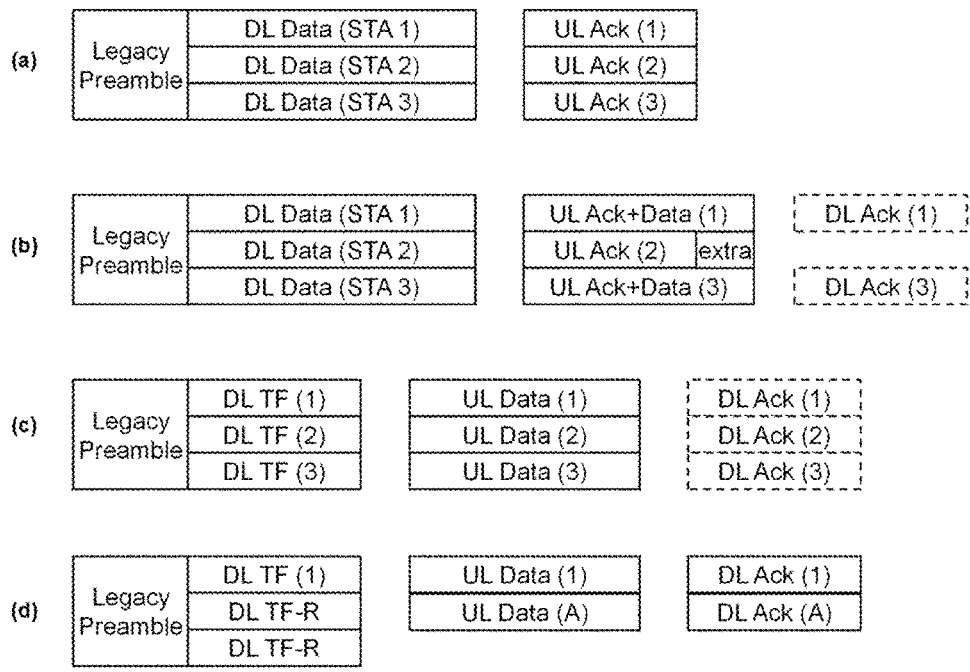
FIG. 10 shows that the wireless communication terminal according to an embodiment of the present invention protects the communication sequence with a plurality of LR wireless communication terminals using the signaling field indicating the length of the PPDU.

FIG. 10 shows that the wireless communication terminal according to an embodiment of the present invention protects the communication sequence with a plurality of LR wireless communication terminals using the signaling field indicating the length of the PPDU.

As described above, the base wireless communication terminal may transmit data to a plurality of LR wireless communication terminals using OFDMA. A plurality of LR wireless communication terminals may simultaneously transmit an ACK for data received from the base wireless communication terminal to the base wireless communication terminal. In this case, a plurality of LR wireless communication terminals may use OFDMA. Further, the plurality of LR wireless communication terminals may simultaneously terminate ACK transmission of data received from the base wireless communication terminal. For this, a plurality of LR wireless communication terminals may use a predetermined MCS or an MCS indicated by a base wireless communication terminal through downlink data. Also, the plurality of LR wireless communication terminals may transmit an ACK for data received from the base wireless communication terminal to the base wireless communication terminal using the RU that received the data from the base wireless communication terminal. In these embodiments, the length information included in the non-LR preamble may indicate a length from a predetermined point to a point corresponding to a time point at which a plurality of LR wireless communication terminals complete ACK transmission of data received from the base wireless communication terminal.

In the embodiment of FIG. 10(a), the base wireless communication terminal transmits a legacy preamble Legacy Preamble and transmits an LR preamble DL LR Preamble and an LR data field DL LR Data to the first LR station STA1 to the third LR station STA3. In this case, the base wireless communication terminal may set the length information included in the non-LR preamble to a length corresponding to a interval from the predetermined time point to the interval until the first LR station STA1 to the third LR station STA3 completes ACK transmission. The first LR station STA1 to the third LR station STA3 transmit an ACK for data received from the base wireless communication terminal using the RU that received the LR data field. Therefore, the ACK transmission of the first LR station STA1 to the third LR station STA3 may be protected by the length information included in the legacy preamble.

In the above-described embodiment, a plurality of LR wireless communication terminals may transmit data to the base wireless communication terminal together with an ACK. Specifically, a plurality of LR wireless communication terminals may transmit data together with ACK according to the uplink transmission length indicated by the base wireless communication terminal. Even if there is no data to be transmitted by the LR wireless communication terminal, the plurality of LR wireless communication terminals may simultaneously terminate the transmission for the base wireless communication terminal as described above. In this case, the LR wireless communication terminal having no data to transmit may transmit ACK and transmit an MAC layer padding or a physical layer padding during the remaining uplink transmission interval. The physical layer padding may be dummy data in OFDM symbol units. In another specific embodiment, the LR wireless communication terminal having no data to transmit may adjust the MCS to match the uplink transmission length with the uplink transmission length of the other LR wireless communication terminals. Specifically, the LR wireless communication terminal having no data to transmit may adjust the uplink transmission length to the uplink transmission length of other LR wireless communication terminals using a relatively low MCS than the MCS which is used by other LR wireless communication terminals. In another specific embodiment, the LR wireless communication terminal having no data to transmit may repeatedly transmit the MPDU including the ACK to match the uplink transmission length with the uplink transmission length of the other LR wireless communication terminals. The base wireless communication terminal may transmit an ACK for uplink data transmitted by the LR wireless communication terminal as needed. In this case, the base wireless communication terminal may transmit the ACK through the LR data field without transmitting the legacy preamble.

In the embodiment of FIG. 10(b), the base wireless communication terminal transmits a legacy preamble Legacy Preamble and transmits an LR preamble DL LR Preamble and an LR data field DL LR Data to the first LR station STA1 to the third LR station STA3. In this case, the base wireless communication terminal may set the length information included in the non-LR preamble to a length corresponding to an interval from the predetermined time point to the interval until the first LR station STA1 to the third LR station STA3 completes uplink transmission. The first LR station STA1 to the third LR station STA3 transmit an ACK for data received from the base wireless communication terminal using the RU that received the LR data field. In this case, the first LR station STA1 and the third LR station STA3 transmit data together with the ACK. The uplink transmission of the first LR station STA1 to the third LR station STA3 may be protected by the length information included in the legacy preamble. In this case, the base wireless communication terminal may transmit an ACK for data transmitted by the first LR station STA1 and the third LR station STA3 as needed. In this case, the base wireless communication terminal may transmit the ACK through the LR data field without transmitting the legacy preamble.

The base wireless communication terminal may transmit a trigger frame that triggers uplink transmission of a plurality of LR wireless communication terminals. In this case, the trigger frame may indicate the length of the uplink transmission. The plurality of LR wireless communication terminals may determine the length of the uplink transmission PPDU according to the length of the uplink transmission indicated by the trigger frame. The plurality of LR wireless communication terminals may transmit the PPDU including the uplink transmission data having the determined length.

The base wireless communication terminal may transmit an ACK for uplink transmission of a plurality of LR wireless communication terminals as when the base wireless communication terminal communicates with one LR wireless communication terminal. In this case, the base wireless communication terminal may set the length information included in the non-LR preamble to a length from the predetermined point in the PPDU to a point corresponding to when the ACK transmission for the uplink transmission of the plurality of LR wireless communication terminals is completed.

The base wireless communication terminal may not transmit an ACK for uplink transmission of the LR wireless communication terminal as when the base wireless communication terminal communicates with one LR wireless communication terminal. In this case, the base wireless communication terminal may transmit an ACK for the uplink transmission of the LR wireless communication terminal together when transmitting the next trigger frame. In another specific embodiment, as the base wireless communication terminal does not trigger the uplink transmission of the LR wireless communication terminal again to implicitly signal that the uplink transmission is successful. The base wireless communication terminal may set the length information included in the non-LR preamble to a length from the predetermined point in the PPDU to the point corresponding to when the uplink transmission of the LR wireless communication terminal is completed. In a specific embodiment, the base wireless communication terminal may use a trigger frame to indicate whether the base wireless communication terminal transmits an ACK for uplink transmission of the LR wireless communication terminal.

In addition, a plurality of LR wireless communication terminals may transmit the BSR together with the uplink data when performing the uplink transmission to the base wireless communication terminal. In this case, the base wireless communication terminal may determine whether to further transmit the trigger frame based on the BSR transmitted by the LR wireless communication terminal.

In the embodiment of FIG. 10(c), the base wireless communication terminal transmits a legacy preamble Legacy Preamble and transmits an LR preamble DL LR Preamble and an LR data field DL TF including a trigger frame to the first LR station STA1 to the third LR station STA3. In this case, the base wireless communication terminal may set the length information included in the non-LR preamble to a length corresponding to an interval from the predetermined time point to the interval until the first LR station STA1 to the third LR station STA3 completes uplink transmission. The first LR station STA1 to the third LR station STA3 transmit uplink data to the base wireless communication terminal using the RU that received the LR data field. The uplink transmission of the first LR station STA1 to the third LR station STA3 may be protected by the length information included in the legacy preamble. In this case, the base wireless communication terminal may transmit an ACK for data transmitted by the first LR station STA1 and the third LR station STA3 as needed. In this case, the base wireless communication terminal may transmit the ACK through the LR data field without transmitting the legacy preamble. In addition, the base wireless communication terminal may set the length information included in the non-LR preamble to a length corresponding to a interval until the ACK for the uplink transmission of the first LR station STA1 to the third LR station STA3 is transmitted completely.

Further, in the above-described embodiment, the base wireless communication terminal may trigger the uplink transmission of an arbitrary LR wireless communication terminal using the trigger frame. Specifically, the base wireless communication terminal may set the value of the AID of the wireless communication terminal corresponding to the RU to a predetermined value, and trigger an uplink transmission of an arbitrary LR wireless communication terminal through the corresponding RU. In this case, the predetermined value may be zero. Moreover, the predetermined value may be an AID that is not allocated to the HE wireless communication terminal. Specifically, the predetermined value may be 2046. In yet another specific embodiment, the predetermined value may be 2047.

Further, the LR wireless communication terminal may random access the RU indicated by the trigger frame based on the value of the parameter indicated by the trigger frame. Specifically, the LR wireless communication terminal may select a random value within a certain range, and determine randomly access by comparing the random value with a value of a parameter indicated by the trigger frame. For example, the LR wireless communication terminal may select a random value within a certain range, and access the RU indicated by the trigger frame when the selected random value is larger than the value of the parameter indicated by the trigger frame.

In another specific embodiment, the LR wireless communication terminal may select a random value as a counter within a certain range, and may reduce the counter based on reception of a trigger frame indicating random access. In this case, when the counter becomes 0, the LR wireless communication terminal may access the RU indicated by the trigger frame. Specifically, the LR wireless communication terminal may reduce the counter by the number of trigger frames indicating the random access received by the LR wireless communication terminal. In addition, the range for selecting an arbitrary value may be determined according to the number of RUs that may be randomly accessed. Specifically, the range for selecting an random value may become larger as the number of RUs that may be randomly accessed increases. In addition, when the counter becomes 0, when there are a plurality of RUs that may be randomly accessed, the LR wireless communication terminal may randomly select and access any one of the RUs that may be randomly accessed. Through these embodiments, it is possible to prevent a plurality of LR wireless communication terminals from accessing the same RU.

A method of using a beacon frame for a LR wireless communication terminal by a wireless communication terminal according to an embodiment of the present invention will be described with reference to FIGS. 11 to 12.

Figure 11:
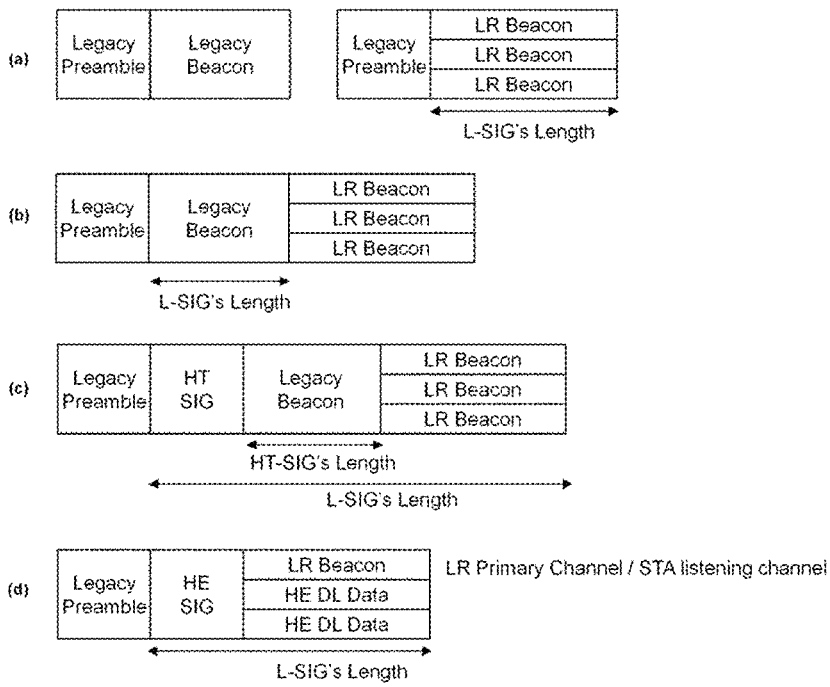
FIG. 11 shows that a wireless communication terminal according to an embodiment of the present invention transmits a beacon frame for an LR wireless communication terminal.

FIG. 11 shows that a wireless communication terminal according to an embodiment of the present invention transmits a beacon frame for an LR wireless communication terminal.

The base wireless communication terminal may periodically transmit a beacon frame for the non-LR wireless communication terminal. In this case, the beacon frame may signal information on the BSS. The base wireless communication terminal may transmit the LR beacon frame for the LR wireless communication terminal. For convenience of explanation, a beacon frame for a non-LR wireless communication terminal is referred to as a legacy beacon frame.

The base wireless communication terminal may transmit the LR beacon frame for the LR wireless communication terminal using the LR data field transmission method described above. As in the above-described embodiments, the length information included in the non-LR preamble may indicate the distance from the predetermined point to the LR data field including the LR beacon frame. Also, the LR wireless communication terminal may receive the LR beacon frame through the RU allocated from the base wireless communication terminal. In this case, the RU allocated from the base wireless communication terminal of the LR wireless communication terminal may have a fixed position as described above. Specifically, when the base wireless communication terminal is associated with the LR wireless communication terminal, the base wireless communication terminal may allocate a fixed location RU to the LR wireless communication terminal. Also, the RU of the fixed location allocated to the LR wireless communication terminal may be maintained until the base wireless communication terminal and the LR wireless communication terminal are disassociated or reassociated. In addition, an LR wireless communication terminal unassociated with a base wireless communication terminal may receive an LR beacon frame through a designated RU for the unassociated LR wireless communication terminal. The RU designated for the unassociated LR wireless communication terminal may be set for each base wireless communication terminal. In addition, the RU designated for the unassociated LR wireless communication terminal may be set according to a certain rule in the whole network.

The base wireless communication terminal may periodically transmit the LR beacon frame. Specifically, the base wireless communication terminal may transmit the LR beacon frame in a period equal to the transmission period of the legacy beacon frame. In another specific embodiment, the base wireless communication terminal may transmit the LR beacon frame in a period longer than the transmission period of the legacy beacon frame. In this case, the transmission interval of the LR beacon frame may be a multiple of the transmission period of the legacy beacon frame. For example, the base wireless communication terminal may transmit the legacy beacon frame in a period of 100 ms and transmit the LR beacon frame in a period of 200 to 300 ms.

In the embodiment of FIG. 11(a), the base wireless communication terminal transmits an LR beacon frame LR Beacon and a legacy beacon frame Legacy Beacon using a separate PPDU. The length information included in the legacy preamble Legacy Preamble of the PPDU including the LR beacon frame indicates the length from the predetermined point in the PPDU to the end point of the LR beacon frame LR Beacon. The length information included in the legacy preamble Legacy Preamble may be an L_Rate sub-field and an L_Length sub-field of the L-SIG field.

The base wireless communication terminal may transmit the legacy beacon frame and the LR beacon frame in one PPDU. The base wireless communication terminal may set the length information included in the non-LR preamble to the length from the predetermined point in the PPDU to the end point of the legacy beacon frame. In this case, the transmission of the LR beacon frame may not be protected through the length information included in the non-LR preamble.

In the embodiment of FIG. 11(b), the base wireless communication terminal transmits a legacy preamble Legacy Preamble and transmits a non-LR data field including a legacy beacon frame Legacy Beacon. In this case, the base wireless communication terminal transmits the non-LR data field including the legacy beacon frame Legacy Beacon, and then transmits the LR data field including the LR beacon frame LR Beacon in the same PPDU.

When the base wireless communication terminal transmits the legacy beacon frame and the LR beacon frame in one PPDU, the base wireless communication terminal may set the first length information and the second length information included in the non-LR preamble as follows. The base wireless communication terminal may set the first length information to a length from the predetermined point in the PPDU to the end point of the LR beacon frame, and set the second length information to a length from a predetermined point in the PPDU to the end point of the legacy beacon frame. In this case, the signaling field including the first length information may be a signaling field transmitted before the signaling field including the second length information. Also, the signaling field including the first length information may be a signaling field that is decodable by more wireless communication terminals than the signaling field including the second length information. Specifically, the first length information may be included in the L-SIG field and the second length information may be included in the HT-SIG field.

In the embodiment of FIG. 11(c), the base wireless communication terminal transmits a legacy preamble Legacy Preamble and an HT-SIG field and transmits a non-LR data field including a legacy beacon frame Legacy Beacon. In this case, the base wireless communication terminal transmits the non-LR data field including the legacy beacon frame Legacy Beacon, and then transmits the LR data field including the LR beacon frame LR Beacon in the same PPDU. In this case, the base wireless communication terminal sets the L_Rate subfield and the L_Length subfield of the L-SIG according to the length from the L-SIG to the end point of the LR beacon frame. Also, the base wireless communication terminal sets the Length field included in the HT-SIG field to a distance from the HT-SIG field to the end point of the legacy beacon frame.

The base wireless communication terminal may divide the frequency band in one PPDU to simultaneously transmit the non-LR data field and the LR data field. Therefore, the base wireless communication terminal may divide the frequency band in one PPDU to simultaneously transmit the LR data field including the non-LR data field and the LR beacon frame. In this case, the PPDU may follow the HE MU PPDU format of IEEE802.11ax. In addition, the base wireless communication terminal may set the length information included in the non-LR preamble to the length from the predetermined point in the PPDU to the end point of the PPDU. Also, the base wireless communication terminal may signal the information on the RU allocated to the non-LR wireless communication terminal using the signaling field for the non-LR wireless communication terminal. Also, the base wireless communication terminal may transmit the LR beacon frame through a specific RU. In this case, the specific RU may be an RU designated in the association process of the base wireless communication terminal and the LR wireless communication terminal. In another specific embodiment, a specific RU may be set according to certain rules in the entire network. For example, the LR beacon frame may be transmitted on the primary channel for the LR wireless communication terminal. Also, an unassociated LR wireless communication terminal may receive a beacon frame through a RU designated for an unassociated LR wireless communication terminal. The RU designated for the unassociated LR wireless communication terminal may be set for each base wireless communication terminal. The RU designated for the unassociated LR wireless communication terminal may be set according to a certain rule in the whole network. Also, the RU used by the LR wireless communication terminal may indicate a sub-channel of the RU designated for the non-LR wireless communication terminal. According to these embodiments, the non-LR wireless communication terminal may receive the data field of the non-LR wireless communication terminal. Further, the LR wireless communication terminal may receive the LR beacon.

In the embodiment of FIG. 11(d), the base wireless communication terminal transmits a legacy preamble Legacy Preamble and transmits an HE-SIG field. After transmitting the HE-SIG field, the base wireless communication terminal divides the frequency band in which the PPDU is transmitted to transmit an LR beacon frame and a data field for the HE wireless communication terminal. In this case, the base wireless communication terminal may transmit the LR beacon frame through the primary channel LR Primary Channel for the LR wireless communication terminal. Also, the base wireless communication terminal sets the values of the L_Rate sub-field and the L_Length sub-field of the L-SIG field according to the length from the L-SIG to the PPDU end point.

A sequence in which the LR wireless communication terminal is associated with the base wireless communication terminal based on the LR beacon frame will be described with reference to FIG. 12.

Figure 12:
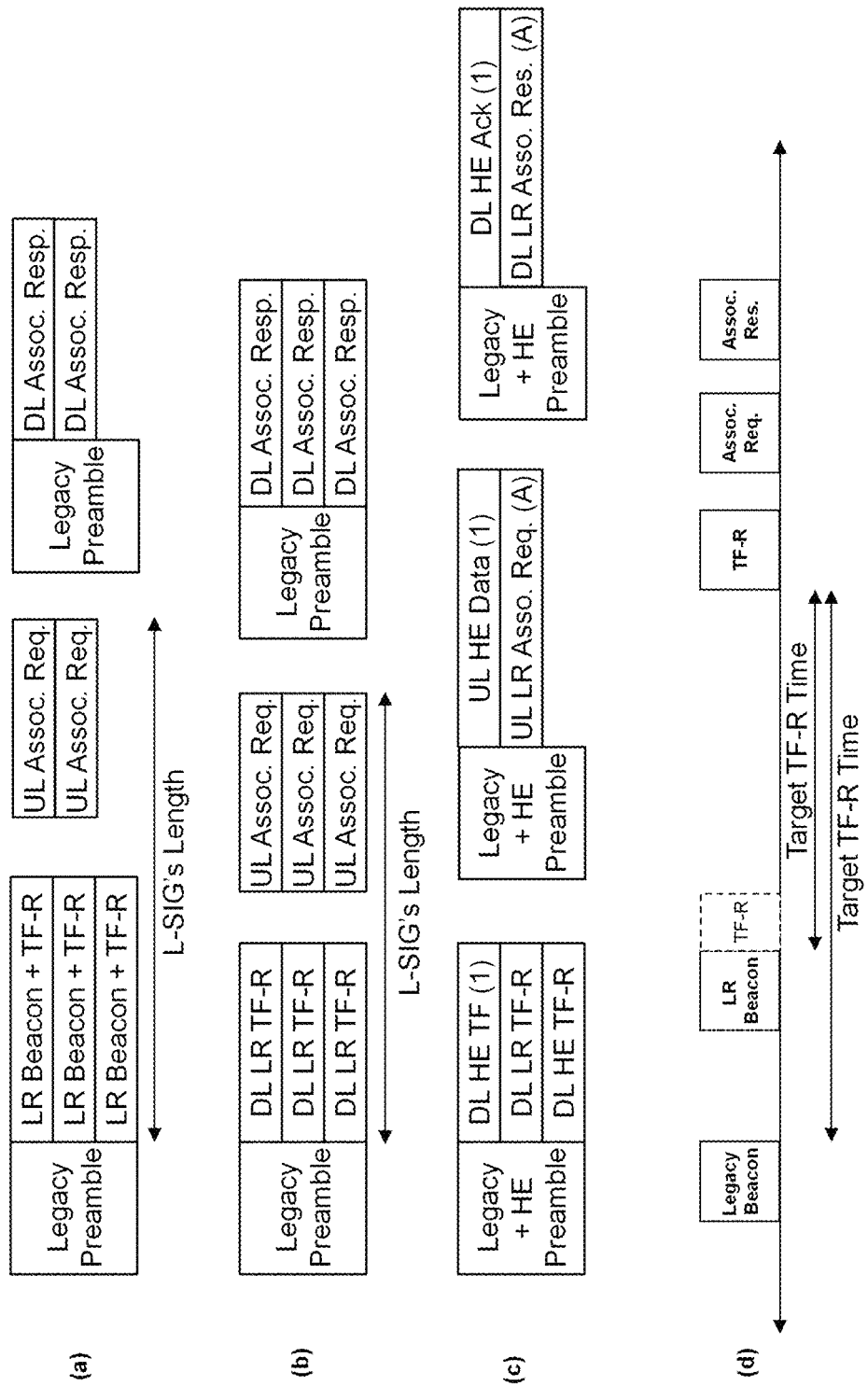
FIG. 12 shows a sequence in which wireless communication terminals according to an embodiment of the present invention are associated.

FIG. 12 shows a sequence in which wireless communication terminals according to an embodiment of the present invention are associated.

The base wireless communication terminal may transmit the PPDU including the LR beacon and the trigger frame triggering the uplink transmission of the LR wireless communication terminal. In this case, the LR wireless communication terminal may transmit an Association Request frame to the base wireless communication terminal based on the trigger frame. Specifically, a plurality of LR wireless communication terminals may transmit an Association Request frame to a base wireless communication terminal through a Multi-User (MU) uplink transmission based on a trigger frame. As in the previously described embodiments, the base wireless communication terminal may set the length information included in the non-LR preamble of the PPDU including the LR beacon and the trigger frame triggering the uplink transmission of the LR wireless communication terminal to a length from a predetermined time point to a point corresponding to when the transmission of Association Request frames of a plurality of LR wireless communication terminals is completed. In addition, the plurality of LR wireless communication terminals transmitting the Association Request frame may match the length of the uplink transmission with the uplink transmission length of the other LR wireless communication terminals using a predetermined MCS or an MCS indicated by the trigger frame. In addition, the trigger frame may trigger uplink transmission of an arbitrary unassociated LR wireless communication terminal. The base wireless communication terminal may receive the association request frame from the LR wireless communication terminal and transmit the association response frame to the LR wireless communication terminal through the RU in which the association request frame is transmitted.

In the embodiment of FIG. 12(a), the base wireless communication terminal transmits a legacy preamble, and transmits an LR data field (LR Beacon+TF-R) including an LR beacon frame and a trigger frame that triggers the access of an arbitrary wireless communication terminal. In this case, the base wireless communication terminal may set the L_Rate subfield and L_Length subfield of the L-SIG field of the legacy preamble according to the distance from the L-SIG field to the end point of the association request frame UL Assoc. Req. of the LR wireless communication terminal. The base wireless communication terminal receives an association request frame UL Assoc. Req. from the LR wireless communication terminal. The base wireless communication terminal transmits a legacy preamble and transmits an association response frame DL Assoc. Resp. to the LR wireless communication terminal that transmitted the association request frame UL Assoc. Req. In this case, the base wireless communication terminal transmits an association response frame DL Assoc. Resp. through the RU receiving the association request frame UL Assoc.Req.

In another specific embodiment, the base wireless communication terminal may transmit a PPDU including a trigger frame that triggers uplink transmission of an arbitrary LR wireless communication terminal. In this case, the LR wireless communication terminal may transmit data based on the trigger frame that triggers the uplink transmission of an arbitrary LR wireless communication terminal. Also, when the LR wireless communication terminal is an unassociated LR wireless communication terminal, the LR wireless communication terminal may transmit the association request frame based on the trigger frame that triggers the uplink transmission of an arbitrary LR wireless communication terminal. Accordingly, the base wireless communication terminal may trigger an association sequence by transmitting a trigger frame that triggers an uplink transmission of an arbitrary LR wireless communication terminal.

In this case, the base wireless communication terminal may set the value of the AID of the wireless communication terminal corresponding to the RU to a predetermined value, and trigger an uplink transmission of an arbitrary LR wireless communication terminal to the corresponding RU. The predetermined value may be zero. Also, the predetermined value may be an AID that is not allocated to the HE wireless communication terminal operating based on the IEEE 802.11ax standard. Specifically, the predetermined value may be 2046. In yet another specific embodiment, the predetermined value may be 2047.

In the embodiment of FIG. 12(b), the base wireless communication terminal transmits a legacy preamble, and transmits an LR data field DL LR TF-R including a trigger frame that triggers the access of an arbitrary wireless communication terminal. In this case, the base wireless communication terminal may perform setting according to the length from the L-SIG field to the association request frame UL Assoc. Req. end point of the LR wireless communication terminal using the L_Rate subfield and L_Length subfield of the L-SIG field of the legacy preamble. The base wireless communication terminal receives an association request frame UL Assoc. Req. from the LR wireless communication terminal. The base wireless communication terminal transmits a legacy preamble and transmits an association response frame DL Assoc. Resp. to the LR wireless communication terminal that transmitted the association request frame UL Assoc. Req. In this case, the base wireless communication terminal transmits an association response frame DL Assoc. Resp. through the RU receiving the association request frame UL Assoc.Req.

In another specific embodiment, the base wireless communication terminal may divide the frequency band to transmit data for the LR wireless communication terminal and data for the non-LR wireless communication terminal together. In this case, the LR wireless communication terminal and the non-LR wireless communication terminal may divide the frequency band to transmit data to the base wireless communication terminal. Also, the base wireless communication terminal may set the length information included in the non-LR preamble to a length from the predetermined time point to a time point when the uplink transmission of the LR wireless communication terminal and the non-LR wireless communication terminal is completed. Also, when the LR wireless communication terminal performs uplink transmission, the LR wireless communication terminal may transmit an association request frame.

The non-LR wireless communication terminal may be an HE wireless communication terminal. Specifically, the base wireless communication terminal may transmit a legacy preamble and a non-LR signaling field using 64 FFT in a frequency band having a bandwidth of 20 MHz. Also, the base wireless communication terminal may transmit an LR signaling field, an HE data field and an LR data field using 256 FFT in a frequency band having a bandwidth of 20 MHz. In addition, when the non-LR wireless communication terminal and the LR wireless communication terminal perform uplink transmission, the non-LR wireless communication terminal may transmit all of OFDM symbols based on 64 FFTs and OFDM symbols based on 256 FFTs. Also, the LR wireless communication terminal may transmit OFDM symbols based on 256 FFTs without transmitting OFDM symbols based on 64 FFTs. In this case, the LR wireless communication terminal may start the uplink transmission after a predetermined time from when the PPDU including the trigger information for triggering the uplink transmission is transmitted. Specifically, the LR wireless communication terminal may start the LR preamble transmission after a predetermined time from when the PPDU including the trigger information for triggering the uplink transmission is transmitted. In this case, the predetermined time may be longer than the Short Inter-Frame Space (SIFS). In a specific embodiment, the LR wireless communication terminal may start the LR preamble transmission after the sum of time taken for the transmission of the SIFS and the legacy preamble and the non-LR signaling field from when the PPDU including the trigger information triggering the uplink transmission is transmitted. In this case, the non-LR signaling field may be the HE-SIG-A field. The LR wireless communication terminal may receive signaling on whether to perform uplink transmission after a predetermined time from when the PPDU including the trigger information is received, from the corresponding trigger information. In this case, the trigger information may trigger the uplink transmission start time point of the LR wireless communication terminal.

In the embodiment of FIG. 12(c), the base wireless communication terminal transmits a legacy preamble and an HE preamble (Legacy+HE Preamble). The base wireless communication terminal divides the frequency band and transmits a trigger frame DL HE TF (1) for triggering a specific HE wireless communication terminal, a trigger frame DL HE TF-R for triggering an arbitrary HE wireless communication terminal, and a trigger frame DL LR TF-R for triggering an arbitrary LR wireless communication terminal. The HE wireless communication terminal and the non-LR wireless communication terminal perform uplink transmission based on the trigger frame received from the base wireless communication terminal. In this case, the HE wireless communication terminal transmits all of the legacy preamble and the HE preamble (Legacy+HE Preamble) and transmits the uplink transmission data UL HE Data (1). The LR wireless communication terminal transmits an association request frame UL LR Asso. Req. (A) without transmitting the legacy preamble and the HE preamble (Legacy+HE Preamble). The base wireless communication terminal transmits the legacy preamble and the HE preamble (Legacy+HE Preamble) and divides the frequency band to transmit an ACK DL HE Ack (1) and an association response frame DL LR Asso. Res. (A) for data transmitted by the HE wireless communication terminal.

Also, the base wireless communication terminal may signal the transmission time point of the trigger frame that triggers the uplink transmission of the LR wireless communication terminal using the LR beacon frame. Also, the base wireless communication terminal may signal the transmission time point of the trigger frame that triggers the uplink transmission of the non-LR wireless communication terminal using the legacy beacon frame. In this case, the base wireless communication terminal may divide the frequency band as described above to transmit a trigger frame for triggering the uplink transmission of the LR wireless communication terminal and a trigger frame for triggering the uplink transmission of the non-LR wireless communication terminal together.

In the embodiment of FIG. 12(d), the base wireless telecommunications terminal transmits a legacy beacon frame to signal to the non-LR wireless communication terminal the transmission time point of the trigger frame that triggers the uplink transmission of an arbitrary non-LR wireless communication terminal. Also, the base wireless communication terminal transmits an LR beacon frame to signal a transmission time point of a trigger frame that triggers an uplink transmission of an arbitrary LR wireless communication terminal to the LR wireless communication terminal. The base wireless communication terminal transmits a trigger frame for triggering the uplink transmission of the LR wireless communication terminal and a trigger frame for triggering the uplink transmission of the non-LR wireless communication terminal at the signaled time point. The LR wireless communication terminal transmits an association request frame Assoc. Req. based on the trigger frame. The base wireless communication terminal receives an association request frame Assoc. Req. and transmits an association response frame Assoc.Res. to the LR wireless communication terminal.

Through FIGS. 13 to 14, an uplink transmission sequence of an LR wireless communication terminal and an uplink transmission scheduling method of a base wireless communication terminal according to an embodiment of the present invention will be described in detail. Part of the embodiments described with reference to FIGS. 13 to 14 relates to a method of transmitting a BSR to an LR wireless communication terminal according to an embodiment of the present invention.

Figure 13:
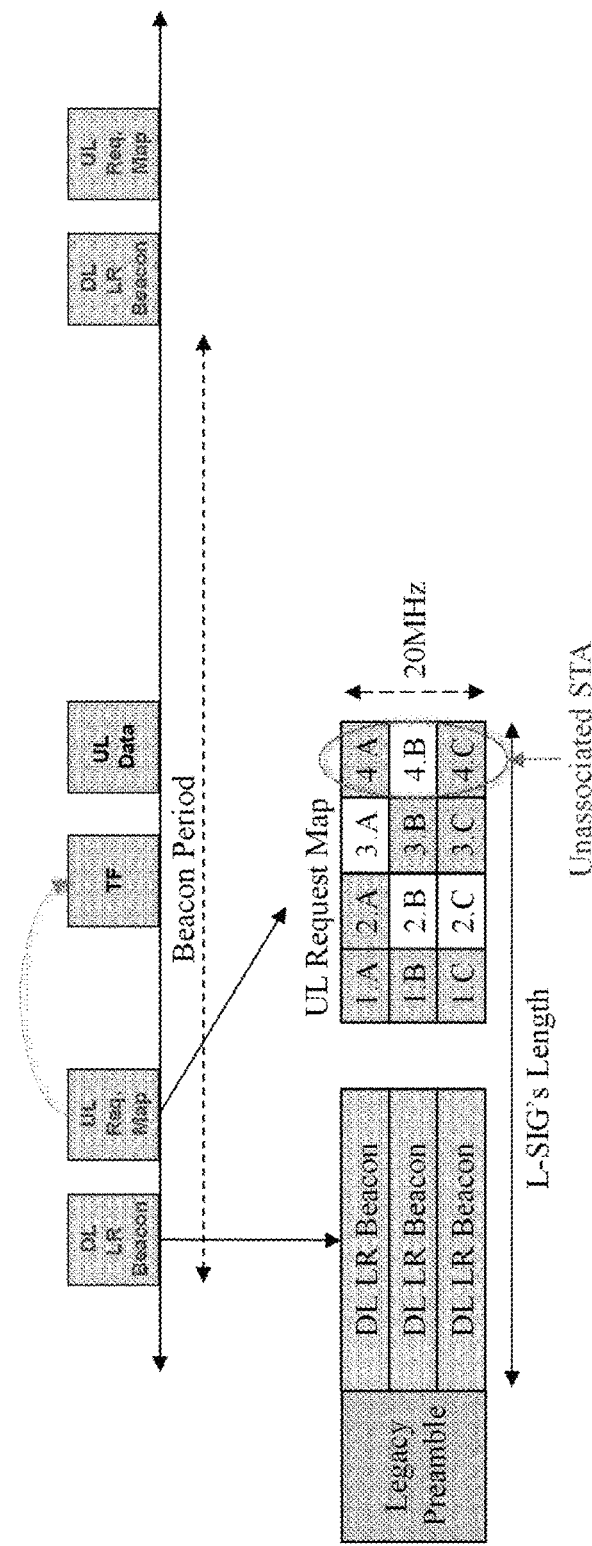
FIG. 13 shows an uplink transmission sequence of an LR wireless communication terminal according to an embodiment of the present invention.

FIG. 13 shows an uplink transmission sequence of an LR wireless communication terminal according to an embodiment of the present invention.

According to an embodiment of the present invention, the LR wireless communication terminal may transmit the BSR to the base wireless communication terminal. The base wireless communication terminal may schedule the uplink transmission sequence of the LR wireless communication terminals by referring to the BSR received from one or more LR wireless communication terminals.

As described above, the available bandwidth of the LR wireless communication terminal may be narrower than the basic transmission bandwidth of the legacy PPDU. That is, when the basic transmission bandwidth of the legacy PPDU is 20 MHz, the available bandwidth of the LR wireless communication terminal may be a predetermined narrow bandwidth of less than 20 MHz, such as 2.5 MHz, 5 MHz, and the like. Therefore, the LR wireless communication terminal may transmit/receive only a predetermined narrow bandwidth signal. As described above, since the LR wireless communication terminal may not receive the PPDU of the 20 MHz bandwidth or more, the LR wireless communication terminal may be difficult to perform the Clear Channel Assessment (CCA) operation in the 20 MHz bandwidth unit used in the legacy wireless LAN system. If the LR wireless communication terminal performs the CCA based on the RF of a narrow bandwidth (e.g., 2.5 MHz, 5 MHz), in the corresponding CCA operation, the signal strength of legacy PPDUs (e.g., PPDU of 20 MHz bandwidth) may be detected weakly. Therefore, the LR wireless communication terminal may more aggressively transmit the uplink LR PPDU. In addition, the LR PPDU separately transmitted by the LR wireless terminal through the narrow bandwidth may not be detected by the CCAs of the non-LR wireless communication terminals. Due to this, collision between the legacy PPDU and the uplink LR PPDU may occur frequently.

In order to solve such a problem, as described above, the LR wireless communication terminals may perform uplink transmission in response to a trigger frame transmitted by the base wireless communication terminal. The LR wireless communication terminal may set a transmission/reception period of the trigger frame in the association process with the base wireless communication terminal, and transmit the uplink data in response to the reception of the periodic trigger frame. However, if the LR wireless communication terminals perform the uplink transmission only in response to the trigger frame by the scheduling of the base wireless communication terminal, there is a restriction on the non-periodically occurring time-dependent (or message transmission time-important) message transmission.

Therefore, according to a further embodiment of the present invention, the LR wireless communication terminal may transmit a BSR to the base wireless communication terminal to request the LR wireless communication terminal's uplink transmission. The base wireless communication terminal may schedule the uplink transmission sequence of the LR wireless communication terminals by referring to the BSR received from one or more LR wireless communication terminals. That is, the base wireless communication terminal determines the LR wireless communication terminal that is to indicate the uplink transmission of the trigger frame based on the received BSR.

More specifically, referring to FIG. 13, the BSR of the LR wireless communication terminal may be transmitted using a predetermined uplink request map. According to an embodiment of the present invention, the uplink request map may be composed of a plurality of slots capable of carrying BSR information of the LR wireless communication terminals. In this case, the plurality of slots may be divided into a plurality of sub-channel slots and/or a plurality of time slots. Each LR wireless communication terminal may receive an allocated slot capable of transmitting a BSR. As in the embodiment of FIG. 13, if the subchannel slots include 'A', 'B' and 'C' and the timeslots include '1', '2', '3' and '4', the uplink request map is composed of 12 slots in total of '1.A', '1.B', . . . , '4.C', and so on. The LR wireless communication terminal receives at least one allocated slot of the uplink request map and transmits its BSR through the allocated slot.

Each slot constituting the uplink request map may be allocated to the LR wireless communication terminal according to various embodiments. According to an embodiment of the present invention, a time slot allocated to each LR wireless communication terminal may be determined based on a separate slot counter managed by each LR wireless communication terminal. The slot counter managed by the LR wireless communication terminal is initially set to a random value within a predetermined range. For each BSR transmission opportunity, the LR wireless communication terminal may reduce the slot counter of the corresponding LR wireless communication terminal by the number of time slots constituting the uplink request map. That is, if the number of time slots constituting the uplink request map is N, the LR wireless communication terminal may reduce the slot counter by N at the corresponding BSR transmission opportunity. If the previous slot counter of the LR wireless communication terminal is M that is equal to or smaller than N, the slot counter of the LR wireless communication terminal is reduced to 0 at the corresponding BSR transmission opportunity. In this case, the LR wireless communication terminal may transmit the BSR through the M-th time slot of the uplink request map at the corresponding BSR transmission opportunity. Meanwhile, the LR wireless communication terminal that fails to reduce the slot counter to 0 at the corresponding BSR transmission opportunity may attempt to transmit the BSR by repeating the above-described slot counter reduction process at the next BSR transmission opportunity.

Also, according to an embodiment of the present invention, a subchannel slot allocated to each LR wireless communication terminal may be determined based on identifier information of each LR wireless communication terminal. According to a specific embodiment, the LR wireless communication terminal may select the subchannel slot based on the value obtained by performing the mod operation on the identifier information of the corresponding LR wireless communication terminal with the number of total sub-channel slots constituting the uplink request map. In this case, the identifier information of the LR wireless communication terminal includes at least one of an association identifier (AID), a partial association identifier (PAID), and a MAC address of the corresponding LR wireless communication terminal. According to a further embodiment of the present invention, the LR wireless communication terminal may randomly select any one of a plurality of sub-channel slots selectable by the LR wireless communication terminal.

The above-described slot allocation methods of the LR wireless communication terminal describe one embodiment of the present invention, and the present invention is not limited thereto. According to an embodiment, considering the channel transmission delay in the long-distance radio transmission channel, the slots constituting the uplink request map may be set in consideration of the guard time. In addition, each slot constituting the uplink request map may be redundantly allocated to a plurality of LR wireless communication terminals. Also, simultaneous communication of more LR wireless communication terminals may be supported using additional orthogonal codes within a specific slot. In addition, a specific slot constituting the uplink request map may be used as a slot for random transmission of unassociated LR wireless communication terminals.

The LR wireless communication terminal transmits the BSR through the slot allocated in the uplink request map. According to an embodiment of the present invention, the BSR of the LR wireless communication terminal using the uplink request map may be transmitted in response to the LR beacon periodically transmitted by the base wireless communication terminal. In this case, the length field included in the non-LR preamble of the PPDU including the LR beacon may be configured in consideration of the BSR transmission time using the uplink request map that is performed subsequent to the corresponding PPDU. In addition, the BSR of the LR wireless communication terminal using the uplink request map may be transmitted following the downlink PPDU transmitted by the base wireless communication terminal. In this case, the length field included in the non-LR preamble of the downlink PPDU may be configured in consideration of the BSR transmission time using the uplink request map that is performed subsequent to the corresponding PPDU. In such a manner, as setting the length field included in the non-NR preamble in consideration of the BSR transmission time of the LR wireless communication terminal performed following the downlink transmission of the base wireless communication terminal, spoofing of legacy wireless communication terminals may be performed.

Figure 14:
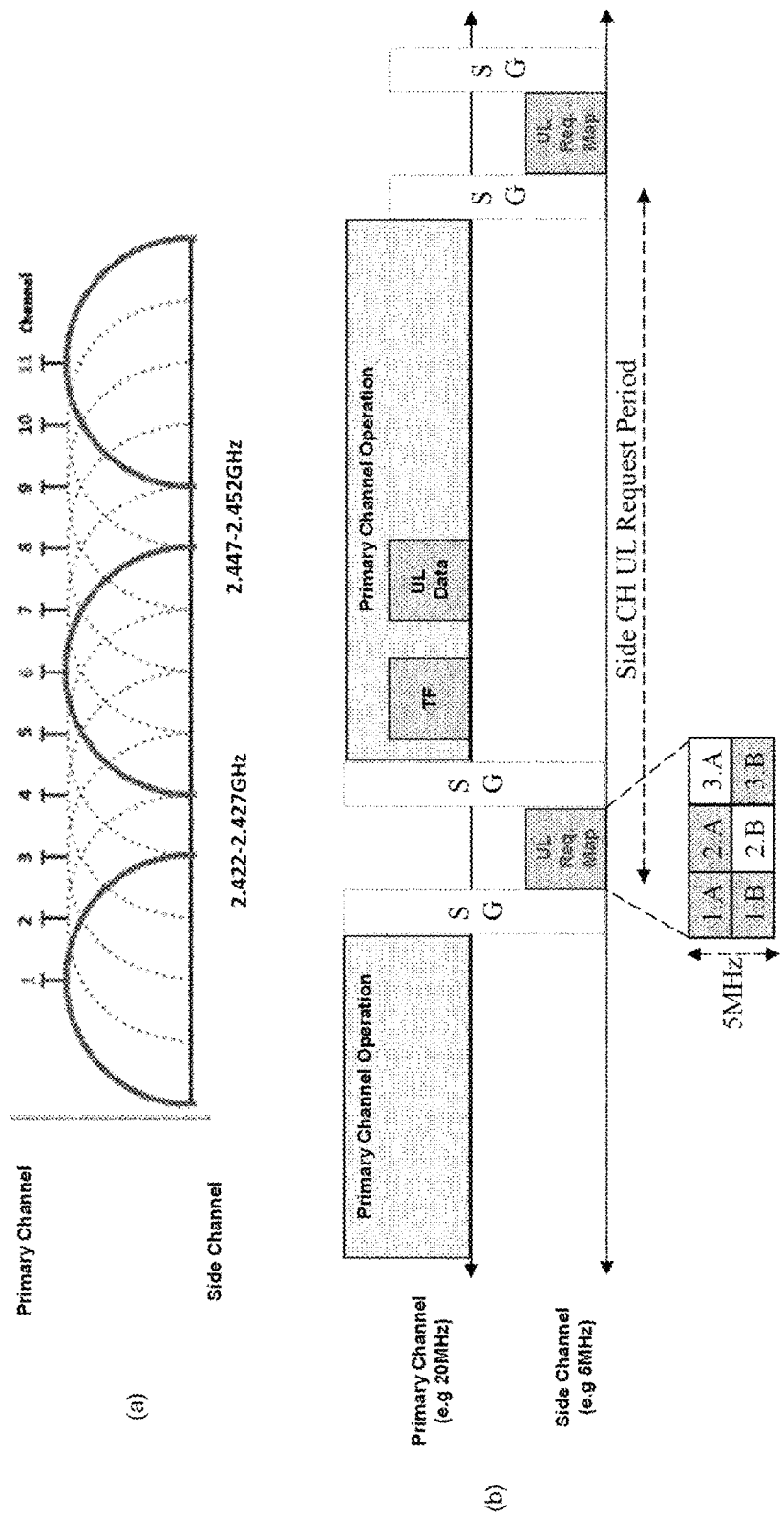
FIG. 14 shows an uplink transmission sequence of an LR wireless communication terminal according to a further embodiment of the present invention.

FIG. 14 shows an uplink transmission sequence of an LR wireless communication terminal according to a further embodiment of the present invention. According to an embodiment of the present invention, the LR wireless communication terminal may transmit the BSR to the access point through a separate designated band.

First, FIG. 14(a) shows a frequency band used in a legacy wireless LAN system. Referring to FIG. 14(a), the ISM band, which is an unlicensed frequency band for a wireless LAN, includes 11 5 MHz bands. In a legacy wireless LAN system, when a specific channel is set as a primary channel, wireless LAN communication may be performed using an adjacent 20 MHz band based on a center frequency of a set channel. In this case, in most legacy wireless LAN systems, the 1st channel, the 6th channel or the 11th channel is set as the primary channel. Therefore, the transmission frequency of the legacy wireless LAN signal becomes very low in specific frequency bands (for example, 2.422 to 2.427 GHz and 2.447 to 2.452 GHz) between the center frequencies of the corresponding channels. According to an embodiment of the present invention, through a specific band in which the transmission frequency of the legacy wireless LAN signal is low, temporary uplink transmission of LR wireless communication terminals may be performed.

Referring to FIG. 14(b), the LR wireless communication terminal may perform a temporary uplink transmission through a predetermined narrowband subchannel. In this case, the predetermined narrowband subchannel may be a subchannel in the 2.422 to 2.427 GHz band or a subchannel in the 2.447 to 2.452 GHz band, but the present invention is not limited thereto. According to another embodiment of the present invention, the predetermined narrowband subchannel may exist in the primary channel. In addition, a specific channel (e.g., a central 2.5 MHz band in a 20 MHz band) in which communication is minimized in a specific wireless LAN standard (such as the 802.11ax standard) may be set as a predetermined narrowband subchannel.

The LR wireless communication terminal transmits a PPDU of a predefined type having a short transmission length through a predetermined narrowband subchannel. According to an embodiment, the LR wireless communication terminal may transmit a BSR using an uplink request map through a predetermined narrowband subchannel.

For data transmission by the LR wireless communication terminals through the predetermined narrowband subchannel, the base wireless communication terminal performs the operation band switching between the primary channel and the predetermined narrowband subchannel Referring to FIG. 14(b), the base wireless communication terminal performs general data communication on the primary channel operated by the base wireless communication terminal, and receives the uplink data transmitted by the LR wireless communication terminals by switching the operation band to the narrowband subchannel in each regular period. As described above, the LR wireless communication terminals may transmit the BSR to the base wireless communication terminal through a specific subchannel/time/code slot of the uplink request map. After the BSR transmission of the LR wireless communication terminals is completed, the trigger frame transmission of the base wireless communication terminal and the uplink transmission of the base wireless communication terminals responding thereto may be performed in the primary channel.

Meanwhile, for the operation band switching between the primary channel and a predetermined narrowband subchannel, a switching gap time may be required for the base wireless communication terminal and the LR wireless communication terminal. According to an embodiment of the present invention, the period during which the uplink transmission through the predetermined narrowband subchannel is performed may be set in consideration of the switching gap time.

According to a further embodiment of the present invention, the LR wireless communication terminal may perform only the minimum CCA and perform a single uplink transmission in the main channel and the narrowband subchannel. Such an operation may be allowed for an LR wireless communication terminal that generates an aperiodic control signal like a switch or an actuator. Such an uplink transmission may be performed after the CCA and the backoff procedure in the narrowband subchannel. Also, the LR wireless communication terminal may immediately receive the response of the base wireless communication terminal through the narrowband subchannel. In this case, if the uplink data to be transmitted by the LR wireless communication terminal is the BSR described above, the corresponding LR wireless communication terminal may transmit only the corresponding LR wireless communication terminal's own identifier information. That is, the LR wireless communication terminal may transmit only the short and robust signal non-periodically in consideration of the possibility of collision with the legacy PPDU.

Although the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from the spirit and scope of the present invention. For example, each component specifically shown in the embodiments may be modified and implemented. It should be interpreted that differences relating to such modifications and application are included in the scope of the present invention defined in the appended claims.

The invention claimed is:

1. A base wireless communication terminal that communicates with a Long Range (LR) wireless communication terminal supporting LR wireless communication, the base wireless comprising:
    a transceiver; and
    a processor,
    wherein the processor is configured to set length information included in a non-LR preamble, which is a preamble for a non-LR wireless communication terminal that does not support LR wireless communication, as a length from a predetermined point in the PPDU to a point corresponding to a time point in which an uplink transmission of the LR wireless communication terminal corresponding to a Physical layer Protocol Data Unit (PPDU) is completed, transmit the PPDU including the non-LR preamble to the LR wireless communication terminal using the transceiver, and when the uplink transmission is not received from the LR wireless communication terminal, re-transmit a portion after the non-LR preamble without transmitting a portion before the non-LR preamble in the PPDU,
    wherein the length information is information for indicating a length from a predetermined point in the PPDU to an end point of the PPDU.

2. The base wireless communication terminal of claim 1, wherein the processor is configured to transmit a data field of the PPDU through a Resource Unit (RU) allocated to the LR wireless communication terminal, and receive the uplink transmission through an RU allocated to the LR wireless communication terminal.

3. The base wireless communication terminal of claim 2, wherein the RU allocated to the LR wireless communication terminal is allocated when the LR wireless communication terminal and the base wireless communication terminal are associated, and is maintained until the LR wireless communication terminal and the base wireless communication terminal are disassociated or reassociated.

4. The base wireless communication terminal of claim 1, wherein when the base wireless communication terminal is scheduled to transmit an ACK for uplink transmission of the LR wireless communication terminal to the LR wireless communication terminal, the processor is configured to set the length information included in the non-LR preamble as a length from a predetermined point in the PPDU to a point corresponding to a time point in which a downlink transmission corresponding to an uplink transmission of the LR wireless communication terminal is completed, wherein the uplink transmission of the LR wireless communication terminal is an uplink transmission corresponding to the PPDU.

5. The base wireless communication terminal of claim 4, wherein the PPDU comprises a trigger frame for triggering an uplink transmission of the LR wireless communication terminal,
    wherein the processor is configured to signal whether an ACK transmission for uplink transmission of the LR wireless communication terminal is scheduled using the trigger frame.

6. The base wireless communication terminal of claim 1, wherein the PPDU comprises a first trigger frame for triggering an uplink transmission of the LR wireless communication terminal,
    wherein when the base wireless communication terminal fails to receive the uplink transmission from the LR wireless communication terminal, the processor is configured to transmit a second trigger frame having the same sequence number as the first trigger frame, and
    when the base wireless communication terminal receives the uplink transmission from the LR wireless communication terminal, the processor is configured to transmit a third trigger frame having a sequence number different from a sequence number of the first trigger frame when triggering a new uplink transmission after the uplink transmission.

7. An operation method of a base wireless communication terminal that communicates with a Long Range (LR) wireless communication terminal supporting LR wireless communication, the method comprising:
    setting length information included in a non-LR preamble, which is a preamble for a non-LR wireless communication terminal that does not support LR wireless communication, as a length from a predetermined point in the PPDU to a point corresponding to a time point in which an uplink transmission of the LR wireless communication terminal corresponding to a Physical layer Protocol Data Unit (PPDU) is completed;
    transmitting the PPDU including the non-LR preamble to the LR wireless communication terminal; and
    when the uplink transmission is not received from the LR wireless communication terminal, re-transmitting a portion after the non-LR preamble without transmitting a portion before the non-LR preamble in the PPDU,
    wherein the length information is information for indicating a length from a predetermined point in the PPDU to an end point of the PPDU.

8. The method of claim 7, wherein the transmitting the PPDU comprises transmitting a data field of the PPDU through a Resource Unit (RU) allocated to the LR wireless communication terminal, further comprising receiving the uplink transmission through an RU allocated to the LR wireless communication terminal.

9. The method of claim 8, wherein the RU allocated to the LR wireless communication terminal is allocated when the LR wireless communication terminal and the base wireless communication terminal are associated, and is maintained until the LR wireless communication terminal and the base wireless communication terminal are disassociated or reassociated.

10. The method of claim 7, wherein the setting the length information included in the non-LR preamble comprises, when the base wireless communication terminal is scheduled to transmit an ACK for uplink transmission of the LR wireless communication terminal to the LR wireless communication terminal, setting the length information included in the non-LR preamble as a length from a predetermined point in the PPDU to a point corresponding to a time point in which a downlink transmission corresponding to an uplink transmission of the LR wireless communication terminal is completed, wherein the uplink transmission of the LR wireless communication terminal is an uplink transmission corresponding to the PPDU.

11. The method of claim 10, wherein the PPDU comprises a trigger frame for triggering an uplink transmission the LR wireless communication terminal, wherein the transmitting the PPDU comprises signaling whether an ACK transmission for uplink transmission of the LR wireless communication terminal is scheduled using the trigger frame.

12. The method of claim 7, wherein the PPDU comprises a first trigger frame for triggering an uplink transmission of the LR wireless communication terminal, wherein when the base wireless communication terminal fails to receive the uplink transmission from the LR wireless communication terminal, the re-transmitting the portion after the non-LR preamble comprises:

when the base wireless communication terminal fails to receive the uplink transmission from the LR wireless communication terminal, transmitting a second trigger frame having the same sequence number as the first trigger frame, and when the base wireless communication terminal receives the uplink transmission from the LR wireless communication terminal, transmitting a third trigger frame having a sequence number different from a sequence number of the first trigger frame when triggering a new uplink transmission after the uplink transmission.

\* \* \* \* \*